US012696256B2

(12) United States Patent
Ansari et al.

(10) Patent No.: US 12,696,256 B2
(45) Date of Patent: Jul. 28, 2026

(54) EXTREMELY HIGH THROUGHPUT AND HIGH FREQUENCY BANDWIDTH SUPPORT INDICATION

(71) Applicant: QUALCOMM Incorporated, San Diego, CA (US)

(72) Inventors: Imran Ansari, Hyderabad (IN); Rajeev Kumar Singh, Hyderabad (IN); Prashant Harkude, Hyderabad (IN); Shaikh Asfaquz Zaman, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 783 days.

(21) Appl. No.: 17/959,938

(22) Filed: Oct. 4, 2022

(65) Prior Publication Data

US 2024/0137923 A1 Apr. 25, 2024

(51) Int. Cl.
*H04W 72/0457* (2023.01)

(52) U.S. Cl.
CPC ............................... *H04W 72/0457* (2023.01)

(58) Field of Classification Search
CPC . H04W 28/20; H04W 48/16; H04W 72/0457; H04W 84/12
See application file for complete search history.

(56) References Cited

U.S. PATENT DOCUMENTS

| | | | |
|---|---|---|---|
| 2007/0008922 A1 | 1/2007 | Abhishek et al. | |
| 2014/0105131 A1 | 4/2014 | Chu et al. | |
| 2021/0143951 A1* | 5/2021 | Chu ...................... | H04L 1/1621 |
| 2021/0235255 A1 | 7/2021 | Ansari et al. | |
| 2024/0064705 A1* | 2/2024 | Chu .................... | H04W 72/04 |
| 2024/0163948 A1* | 5/2024 | Kim ...................... | H04W 76/11 |
| 2024/0430708 A1* | 12/2024 | Nakagawa ............ | H04W 92/18 |

OTHER PUBLICATIONS

International Search Report and Written Opinion—PCT/US2023/071407—ISA/EPO—Nov. 21, 2023.

* cited by examiner

*Primary Examiner* — Donald L Mills
(74) *Attorney, Agent, or Firm* — Holland & Hart LLP

(57) ABSTRACT

Methods, systems, and devices for extremely high throughput (EHT) and high frequency bandwidth (BW) support indication are described. A first wireless device may establish a wireless communication link with a second wireless device, receive, from the second wireless device, a first message, and transmit a second message to the second wireless device. The first message may indicate that the second wireless device is capable of communicating using a first physical layer (PHY) mode having a first latency below a first threshold and a first BW associated with a throughput having a second latency below a second threshold. The second message may similarly indicate whether the first wireless device is capable of communicating using the first PHY mode and the first BW. The first wireless device may select a second PHY mode and a second BW for communicating data with the second wireless device based on receiving the first message.

26 Claims, 12 Drawing Sheets

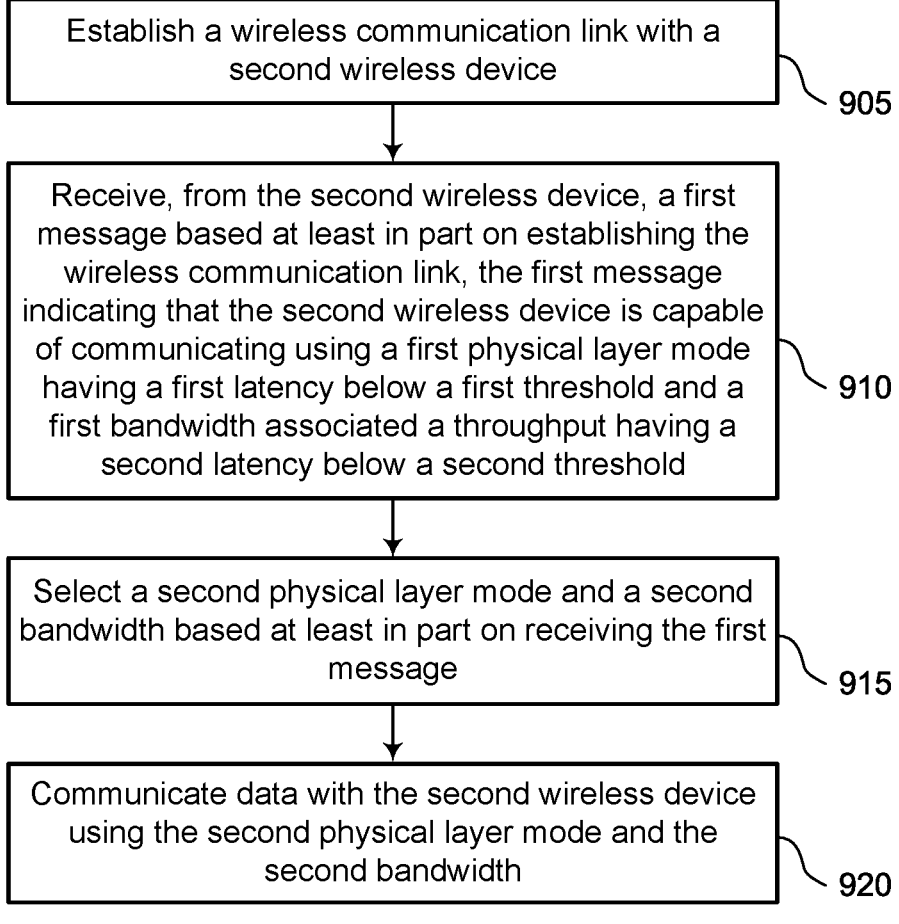

Establish a wireless communication link with a
second wireless device

905

Receive, from the second wireless device, a first
message based at least in part on establishing the
wireless communication link, the first message
indicating that the second wireless device is capable
of communicating using a first physical layer mode
having a first latency below a first threshold and a
first bandwidth associated a throughput having a
second latency below a second threshold

910

Select a second physical layer mode and a second
bandwidth based at least in part on receiving the first
message

915

Communicate data with the second wireless device
using the second physical layer mode and the
second bandwidth

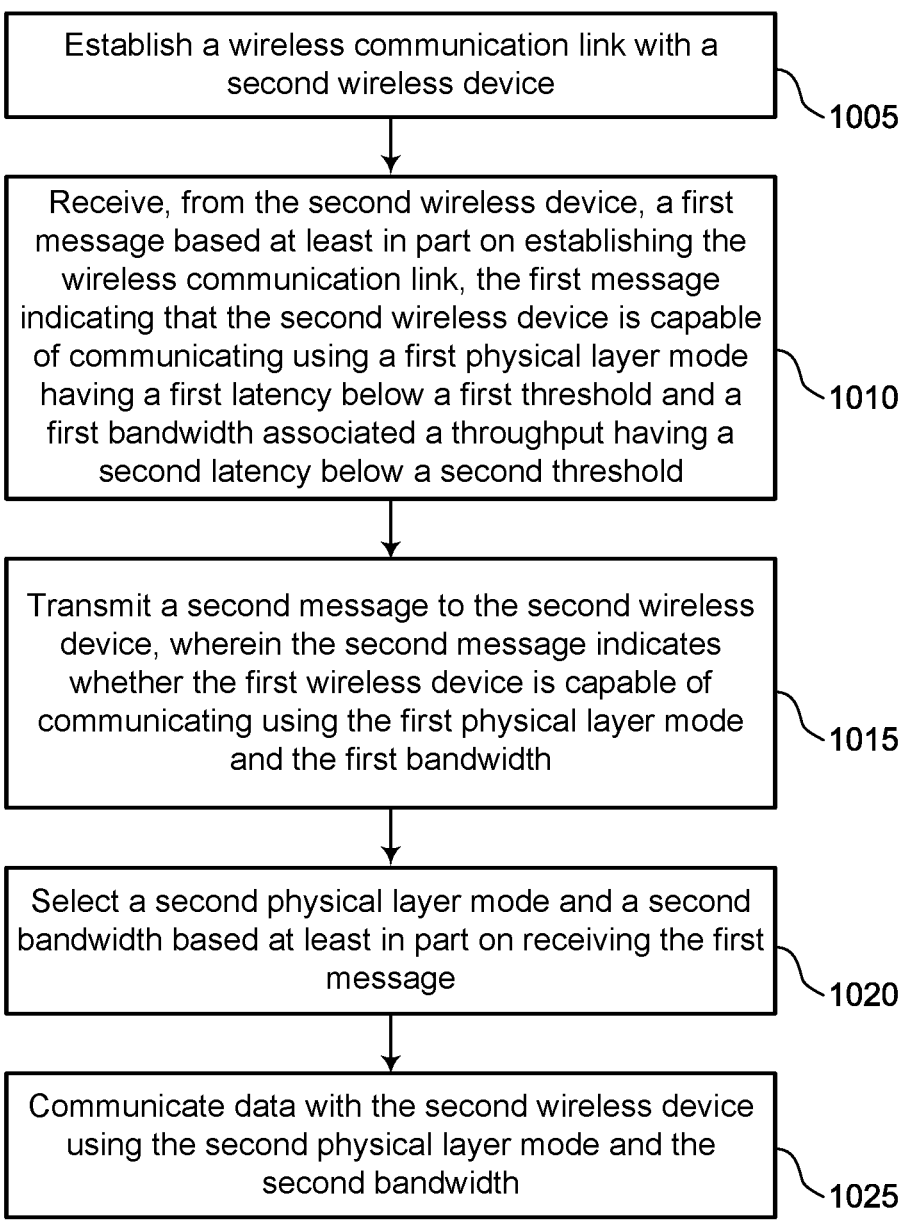

Establish a wireless communication link with a
second wireless device

1005

Receive, from the second wireless device, a first
message based at least in part on establishing the
wireless communication link, the first message
indicating that the second wireless device is capable
of communicating using a first physical layer mode
having a first latency below a first threshold and a
first bandwidth associated a throughput having a
second latency below a second threshold

1010

Transmit a second message to the second wireless
device, wherein the second message indicates
whether the first wireless device is capable of
communicating using the first physical layer mode
and the first bandwidth

1015

Select a second physical layer mode and a second
bandwidth based at least in part on receiving the first
message

1020

Communicate data with the second wireless device
using the second physical layer mode and the
second bandwidth

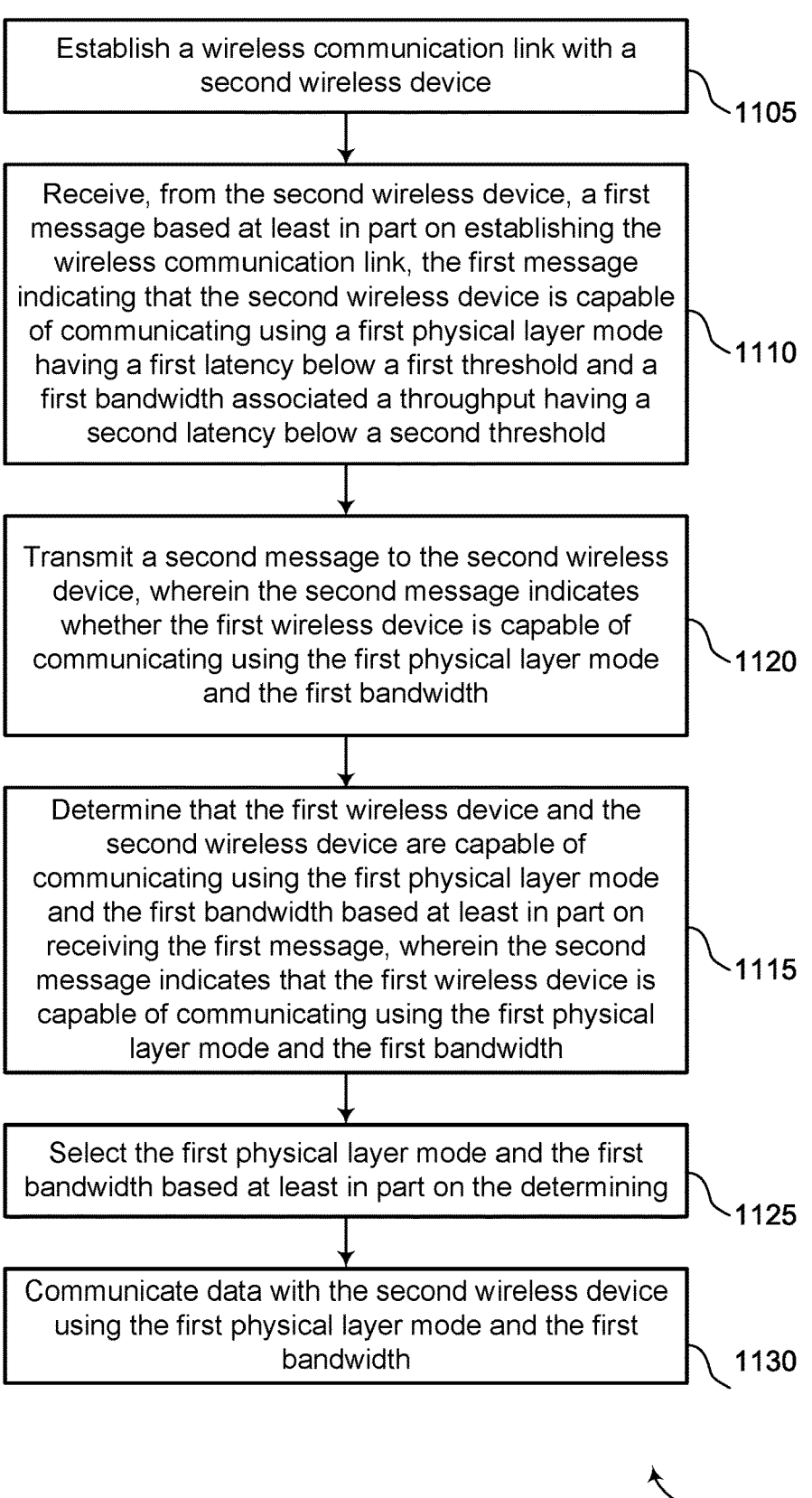

Establish a wireless communication link with a second wireless device

1105

Receive, from the second wireless device, a first message based at least in part on establishing the wireless communication link, the first message indicating that the second wireless device is capable of communicating using a first physical layer mode having a first latency below a first threshold and a first bandwidth associated a throughput having a second latency below a second threshold

1110

Transmit a second message to the second wireless device, wherein the second message indicates whether the first wireless device is capable of communicating using the first physical layer mode and the first bandwidth

1120

Determine that the first wireless device and the second wireless device are capable of communicating using the first physical layer mode and the first bandwidth based at least in part on receiving the first message, wherein the second message indicates that the first wireless device is capable of communicating using the first physical layer mode and the first bandwidth

1115

Select the first physical layer mode and the first bandwidth based at least in part on the determining

1125

Communicate data with the second wireless device using the first physical layer mode and the first bandwidth

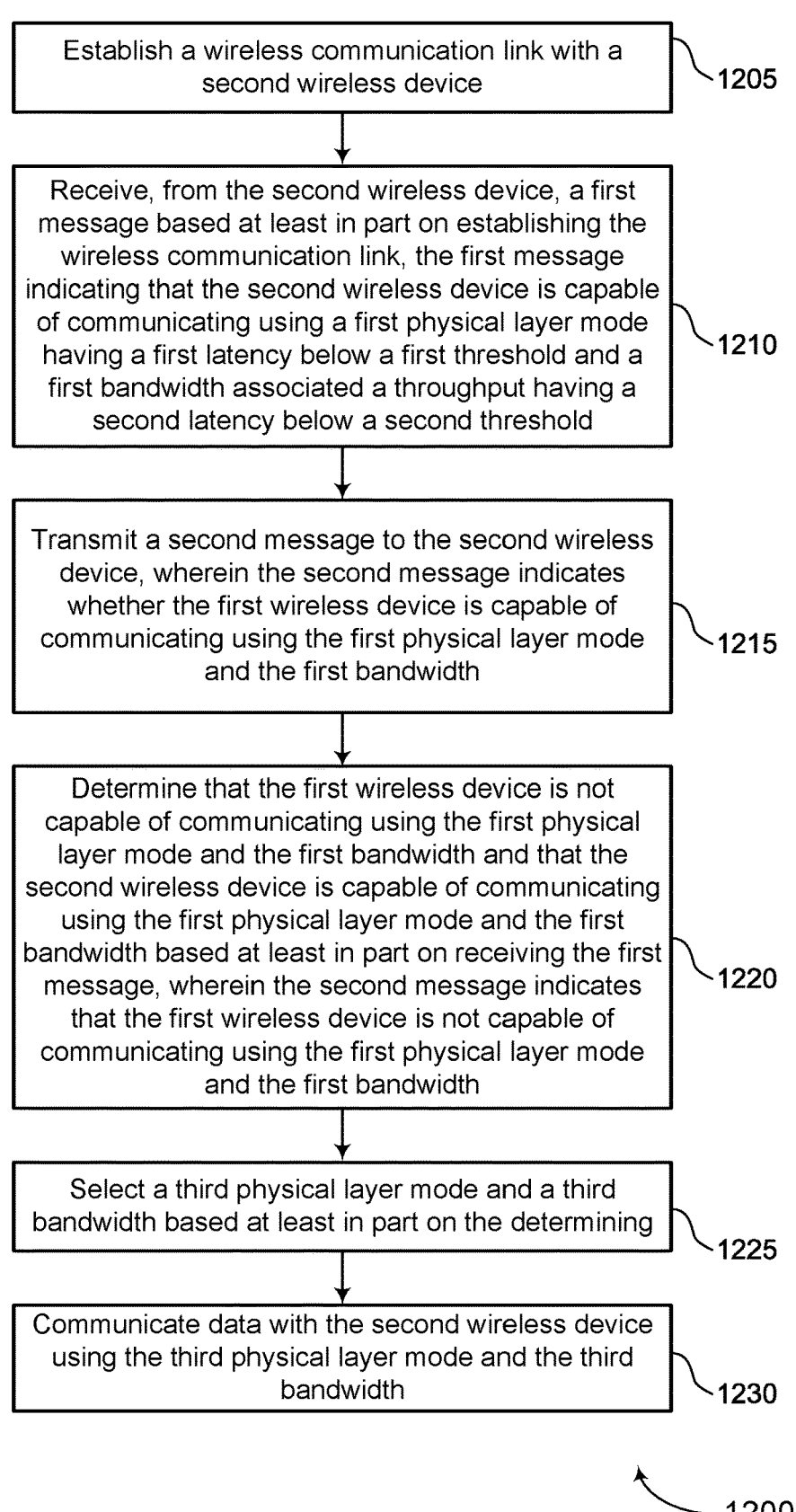

Establish a wireless communication link with a
second wireless device

1205

Receive, from the second wireless device, a first
message based at least in part on establishing the
wireless communication link, the first message
indicating that the second wireless device is capable
of communicating using a first physical layer mode
having a first latency below a first threshold and a
first bandwidth associated a throughput having a
second latency below a second threshold

1210

Transmit a second message to the second wireless
device, wherein the second message indicates
whether the first wireless device is capable of
communicating using the first physical layer mode
and the first bandwidth

1215

Determine that the first wireless device is not
capable of communicating using the first physical
layer mode and the first bandwidth and that the
second wireless device is capable of communicating
using the first physical layer mode and the first
bandwidth based at least in part on receiving the first
message, wherein the second message indicates
that the first wireless device is not capable of
communicating using the first physical layer mode
and the first bandwidth

1220

Select a third physical layer mode and a third
bandwidth based at least in part on the determining

1225

Communicate data with the second wireless device
using the third physical layer mode and the third
bandwidth

EXTREMELY HIGH THROUGHPUT AND HIGH FREQUENCY BANDWIDTH SUPPORT INDICATION

TECHNICAL FIELD

The following relates to wireless communications, including extremely high throughput (EHT) and high frequency bandwidth (BW) support indication.

DESCRIPTION OF THE RELATED TECHNOLOGY

Wireless communications systems are widely deployed to provide various types of communication content such as voice, video, packet data, messaging, broadcast, and so on. These systems may be multiple-access systems capable of supporting communication with multiple users by sharing the available system resources (for example, time, frequency, and power). A wireless network, for example a WLAN, such as a Wi-Fi (in other words, Institute of Electrical and Electronics Engineers (IEEE) 802.11) network may include AP that may communicate with one or more stations (STA) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink and uplink. The downlink (or forward link) may refer to the communication link from the AP to the station, and the uplink (or reverse link) may refer to the communication link from the station to the AP.

In some examples, wireless devices (for example, STAs or other wireless devices) may communicate directly using links, such as peer-to-peer (P2P) links, in a wireless local area network (WLAN). For example, multiple wireless devices may communicate directly with each other using neighbor awareness networking (NAN) without the use of an intermediary access point (for example, an AP such as a router or a gateway device, among other examples). While performing NAN communications, wireless devices may establish a cluster of local devices, perform service discovery by exchanging one or more service discovery frames (SDF), and form a NAN data path (NDP) between the wireless devices based on the one or more SDFs. In some examples, the use of an extremely high throughput (EHT) physical layer (PHY) mode and high frequency bandwidth (BW) support may improve WLAN communications between wireless devices, such as a STA and an AP. For example, a STA (for example, a mobile device) may communicate with an AP (for example, a router) using a 320 Megahertz (MHz) BW and EHT PHY mode, which may enable higher throughput and lower latency in communications. In some examples, the STA may format a preamble and a DATA field of a PHY protocol data unit (PPDU) as an EHT WLAN preamble and frame, respectively, in accordance with various wireless communication protocol standards. However, wireless devices, such as STAs and other mobile devices, may lack techniques for indicating and implementing low latency PHY modes (for example, EHT PHY mode) and low latency throughput BWs (for example, high frequency BWs) in P2P and NAN communications.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method includes establishing a wireless communication link with a second wireless device, receiving, from the second wireless device, a first message based on establishing the wireless communication link, the first message indicating that the second wireless device is capable of communicating using a first physical layer (PHY) mode having a first latency below a first threshold and a first bandwidth (BW) associated with a throughput having a second latency below a second threshold, selecting a second PHY mode and a second BW based on receiving the first message, and communicating data with the second wireless device using the second PHY mode and the second BW.

Another innovative aspect of the subject matter described in this disclosure can be implemented in an apparatus for wireless communication. The apparatus includes a processor, memory coupled with the processor and storing instructions executable by the processor to cause the apparatus to establish a wireless communication link with a second wireless device, receive, from the second wireless device, a first message based on establishing the wireless communication link, the first message indicating that the second wireless device is capable of communicating using a first PHY mode having a first latency below a first threshold and a first BW associated with a throughput having a second latency below a second threshold, select a second PHY mode and a second BW based on receiving the first message, and communicate data with the second wireless device using the second PHY mode and the second BW.

Another innovative aspect of the subject matter described in this disclosure can be implemented in an apparatus for wireless communication. The apparatus includes means for establishing a wireless communication link with a second wireless device, means for receiving, from the second wireless device, a first message based on establishing the wireless communication link, the first message indicating that the second wireless device is capable of communicating using a first PHY mode having a first latency below a first threshold and a first BW associated with a throughput having a second latency below a second threshold, means for selecting a second PHY mode and a second BW based on receiving the first message, and means for communicating data with the second wireless device using the second PHY mode and the second BW.

Another innovative aspect of the subject matter described in this disclosure can be implemented in a non-transitory computer-readable medium storing code for wireless communication. The code includes instructions executable by a processor to establish a wireless communication link with a second wireless device, receive, from the second wireless device, a first message based on establishing the wireless communication link, the first message indicating that the second wireless device is capable of communicating using a first PHY mode having a first latency below a first threshold and a first BW associated with a throughput having a second latency below a second threshold, select a second PHY mode and a second BW based on receiving the first message, and communicate data with the second wireless device using the second PHY mode and the second BW.

Some examples of the method, apparatuses, and non-transitory computer-readable medium described herein may further include operations, features, means, or instructions for transmitting a second message to the second wireless device, in which the second message indicates whether the first wireless device may be capable of communicating using the first PHY mode and the first BW.

In some examples of the method, apparatuses, and non-transitory computer-readable medium described herein, selecting the second PHY mode and the second BW may include operations, features, means, or instructions for determining that the first wireless device and the second wireless device may be capable of communicating using the first PHY mode and the first BW based on receiving the first message, in which the second message indicates that the first wireless device may be capable of communicating using the first PHY mode and the first BW and selecting the first PHY mode and the first BW based on the determining, in which communicating data with the second wireless device includes communicating data with the second wireless device using the first PHY mode and the first BW.

In some examples of the method, apparatuses, and non-transitory computer-readable medium described herein, selecting the second PHY mode and the second BW may include operations, features, means, or instructions for determining that the first wireless device may be not capable of communicating using the first PHY mode and the first BW and that the second wireless device may be capable of communicating using the first PHY mode and the first BW based on receiving the first message, in which the second message indicates that the first wireless device may be not capable of communicating using the first PHY mode and the first BW and selecting a third PHY mode and a third BW based on the determining, in which communicating data with the second wireless device includes communicating data with the second wireless device using the third PHY mode and the third BW.

In some examples of the method, apparatuses, and non-transitory computer-readable medium described herein, selecting the third PHY mode may include operations, features, means, or instructions for determining a common PHY mode supported by the first wireless device and the second wireless device and selecting the common PHY mode based on determining the common PHY mode.

In some examples of the method, apparatuses, and non-transitory computer-readable medium described herein, selecting the third BW may include operations, features, means, or instructions for determining a highest common BW supported by the first wireless device and the second wireless device and selecting the highest common BW.

In some examples of the method, apparatuses, and non-transitory computer-readable medium described herein, the first PHY mode having the first latency below the first threshold may include an extremely high throughput (EHT) PHY mode.

In some examples of the method, apparatuses, and non-transitory computer-readable medium described herein, receiving the first message may include operations, features, means, or instructions for receiving an SDF including a media access control (MAC) header, in which the MAC header includes an information element indicating a capability of communicating using the first PHY mode and the first BW.

In some examples of the method, apparatuses, and non-transitory computer-readable medium described herein, the information element includes a set of multiple bits, in which a bit of the set of multiple bits corresponds to the first PHY mode and in which a bit of the set of multiple bits corresponds to the first BW.

In some examples of the method, apparatuses, and non-transitory computer-readable medium described herein, establishing the wireless communication link with the second wireless device may include operations, features, means, or instructions for establishing a cluster including the first wireless device and the second wireless device.

In some examples of the method, apparatuses, and non-transitory computer-readable medium described herein, communicating data with the second wireless device using the second PHY mode and the second BW may include operations, features, means, or instructions for establishing a neighbor awareness networking (NAN) data path (NDP) between the first wireless device and the second wireless device based on selecting the second PHY mode and the second BW and communicating data with the second wireless device over the NDP.

In some examples of the method, apparatuses, and non-transitory computer-readable medium described herein, the first message indicates a maximum supported BW for the second wireless device.

In some examples of the method, apparatuses, and non-transitory computer-readable medium described herein, the first BW may be a BW of 240 Megahertz or 320 Megahertz.

BRIEF DESCRIPTION OF THE DRAWINGS

FIGS. 9 through 12 show flowcharts illustrating methods that support EHT and high frequency BW support indication in accordance with one or more aspects of the present disclosure.

DETAILED DESCRIPTION

Figure 1:
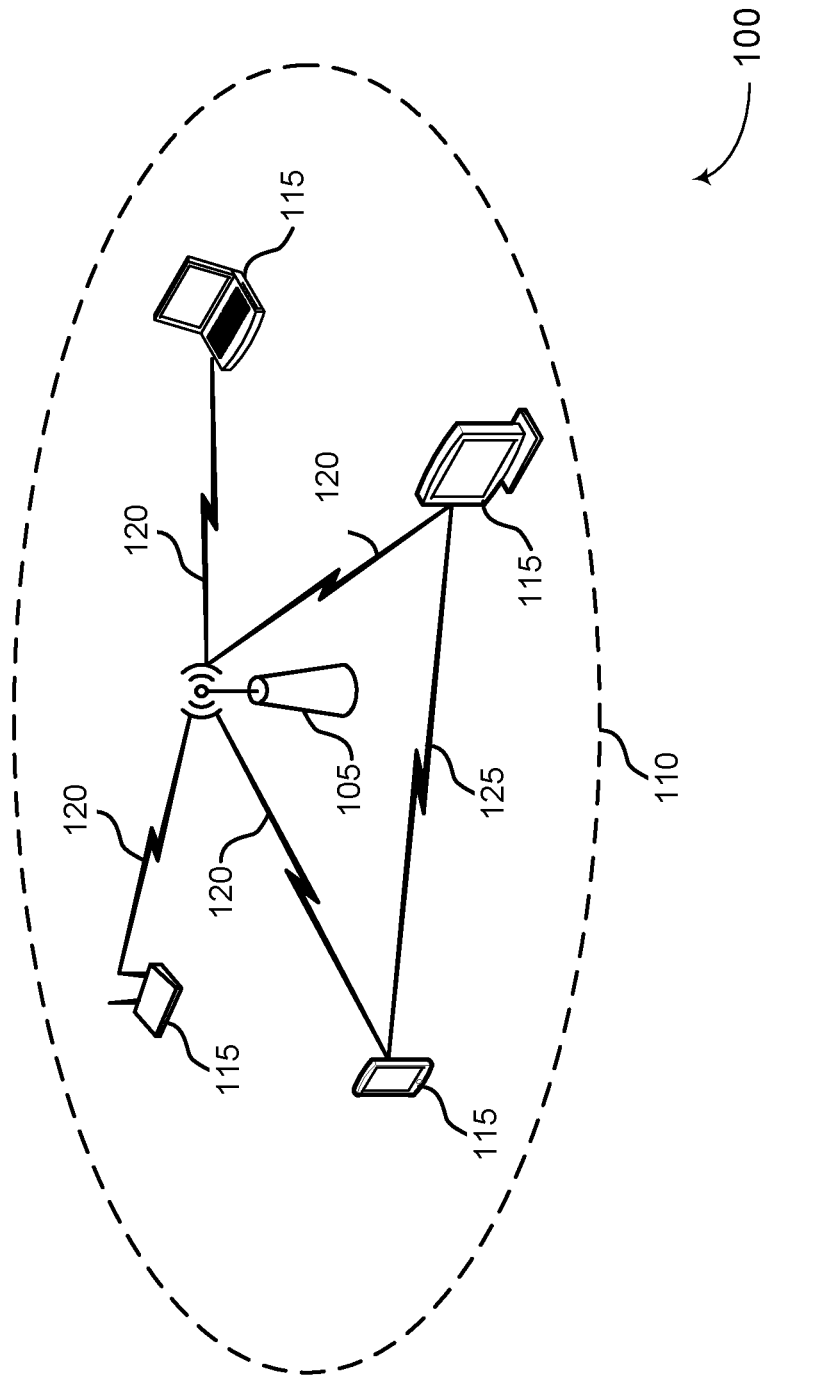
FIGS. 1 and 2 each illustrate an example of a wireless local area network (WLAN) that supports extremely high throughput (EHT) and high frequency bandwidth (BW) support indication in accordance with aspects of the present disclosure

Wireless devices may communicate directly using links, such as peer-to-peer (P2P) links, in a wireless local area network (WLAN). For example, wireless devices, such as stations (STA) or other mobile devices, may communicate directly with each other using neighbor awareness networking (NAN), for example, without the use of an intermediary access point (AP) (such as, a router, a gateway device, among other examples). While performing NAN communications, wireless devices may establish a cluster of local devices and may perform service discovery by exchanging one or more service discovery frames (SDF) before forming a NAN data path (NDP) between the wireless devices based on the SDFs. In some examples, the use of an extremely high throughput (EHT) physical layer (PHY) mode and high frequency bandwidth (BW) support at a wireless device may improve WLAN communications between a STA and an AP. For example, a wireless device may communicate with an AP (for example, a router) using a 320 Megahertz (MHz) BW and EHT PHY mode, enabling higher throughput and lower latency in communications. However, wireless devices may lack techniques for indicating and implementing low latency PHY modes (for example, EHT PHY mode) and low latency throughput BWs (for example, high frequency BWs) in P2P and NAN communications, which may result in slower communication, lower throughput, higher power usage, and higher latency, among other issues.

Various aspects generally relate to techniques for implementing EHT and high frequency BW support indication, and more specifically, to indicating support for low latency PHY modes (for example, EHT) and low latency throughput BWs (for example, high frequency BWs) in an SDF for NAN communications. For example, wireless devices (for example, STAs) may form a cluster as part of NAN communications, and may subsequently perform service discovery by exchanging SDFs. A first wireless device may include additional bits in an information element of a media access control (MAC) header of an SDF transmitted to a second wireless device to indicate support for one or more PHY modes, including low latency PHY modes, and one or more BWs, including lower latency throughput BWs. For example, a first bit may indicate support for EHT PHY mode, and a second bit may indicate support for 240 MHz or 320 MHz BW operation. The first wireless device may receive an SDF from the second wireless device indicating similar or different PHY mode and BW support. After exchanging SDFs, in some examples, the first wireless device and the second wireless device may communicate based on the indicated capabilities. In examples in which both wireless devices indicate support for a same low latency PHY mode, such as EHT PHY mode, and a low latency throughput BW, such as a 320 MHz BW, the wireless devices may establish an NDP for EHT with a maximum BW that is at least the BW (for example, 320 MHz). In examples in which one of the wireless devices (for example, the first wireless device) does not support a BW, such as 320 MHz, or a low latency PHY mode, such as EHT PHY mode, the wireless devices may establish an NDP using a supported PHY mode and a highest common BW (for example, a BW that is less than 320 MHz). For example, in examples in which both wireless devices indicate support for EHT PHY mode, and one wireless device indicates support for a first BW, such as a 320 MHz BW, while the other indicates support for a different BW, such as a 240 MHz BW, the wireless devices may establish an NDP using EHT PHY mode and the different BW operation, such as the 240 MHz BW operation. Additionally, or alternatively, in examples in which one of the wireless devices does not indicate support for a low latency PHY mode, such as EHT PHY mode, the wireless devices may establish an NDP using another available PHY mode and a highest common BW between the two wireless devices.

Particular aspects of the subject matter described herein may be implemented to realize one or more of the following potential advantages. The techniques employed by the described wireless devices may enable use of low latency PHY mode, such as EHT PHY mode, in NAN communications by indicating support for low latency PHY modes during service discovery and establishing NDPs based on the indication. Employing low latency PHY modes (for example, EHT PHY mode) in this manner in NAN communications may result in a higher reliability of communications, a higher throughput, and a lower latency, among other advantages, based on the use of 4K QAM, multiple radio unit (RU) aggregation and preamble puncturing, 6 GHz low power indoor (LPI) channel enhancements, multi-link operation (MLO), and/or low latency enhancements, among other EHT applications. In some examples, a higher throughput may enhance user experience by allowing for an improved exchange of rich-data between multiple peers in wireless communications, which may result in reduced latency, in turn increasing power saving and battery life at wireless devices. Additionally, the techniques employed may enable low latency throughput BWs, such as high frequency BWs, in NAN communications by indicating support for low latency throughput BWs. For example, employing 240 MHz BW or 320 MHz BW may result in decreased latency as well as higher performance and throughput in communications, among other advantages. The use of the low latency PHY modes (for example, EHT PHY mode) and the low latency throughput BWs (for example, high frequency BWs) may also improve user experience in latency and power dependent applications, including augmented reality (AR) and virtual reality (VR) applications. For example, in AR/VR applications associated with relatively large file formats and large quantities of files, higher throughput and lower latency may result in higher framerates, higher supported resolutions, lag reduction, and greater reliability in data transfer, among other advantages.

Aspects of the disclosure are initially described in the context of a wireless communications system. Aspects of the disclosure are also described in the context of SDFs and process flows. Aspects of the disclosure are further illustrated by and described with reference to apparatus diagrams, system diagrams, and flowcharts that relate to EHT and high frequency BW support indication FIG. 1 illustrates a wireless local area network (WLAN) 100 (also known as a Wi-Fi network) configured in accordance with various aspects of the present disclosure. The WLAN 100 may include an AP 105 and multiple associated STAs 115, which may represent devices such as mobile stations, personal digital assistant (PDAs), other handheld devices, netbooks, notebook computers, tablet computers, laptops, display devices (for example, TVs, computer monitors, etc.), printers, etc. The AP 105 and the associated STAs 115 may represent a basic service set (BSS) or an extended service set (ESS). The various STAs 115 in the network are able to communicate with one another through the AP 105. Also shown is a coverage area 110 of the AP 105, which may represent a basic service area (BSA) of the WLAN 100. An extended network station (not shown) associated with the WLAN 100 may be connected to a wired or wireless distribution system that may allow multiple APs 105 to be connected in an ESS.

In the WLAN 100, wireless devices may communicate directly using, for example, peer-to-peer (P2P) links in a wireless local area network (WLAN). For example, multiple STAs 115 may communicate directly with each other using NAN. While performing NAN communications, the STAs 115 may establish a cluster of local devices and may perform service discovery by exchanging one or more SDFs, and may form an NDP between devices based on the SDFs. In some examples, EHT PHY mode and high frequency BW support at a wireless device may improve WLAN communications between an STA 115 and an AP 105. For example, an STA 115 may communicate with an AP 105 using EHT PHY mode and a 240 MHz BW or 320 MHz BW, enabling higher throughput and lower latency in communications. However, wireless devices, such as the STAs 115, may lack techniques for indicating and implementing EHT PHY mode and high frequency BWs in P2P and NAN communications, among other scenarios.

In some examples, to enable implementing low latency PHY mode and low latency throughput BW support in P2P and NAN communications, a wireless device may indicate support for low latency PHY mode and low latency throughput (for example, for EHT PHY mode and high frequency BW) in an SDF. For example, multiple STAs 115 may form a cluster as part of NAN communications, and may subsequently perform service discovery by exchanging SDFs. A first STA 115 may include additional bits in an information element of a MAC header of an SDF transmitted to a second STA 115 to indicate support for one or more low latency PHY modes and one or more BWs, including low latency throughput BWs. For example, the additional bits may indicate support for EHT PHY mode and high frequency BWs, in which the MAC header may indicate supported PHY modes and BWs at the first STA 115 as described with reference to FIG. 3. The first STA 115 may also receive an SDF from the second STA 115 indicating similar or different PHY mode and BW support. After exchanging SDFs, the STAs 115 may communicate based on the indicated capabilities as described with reference to FIGS. 3 and 4. For example, the STAs 115 may establish an NDP using a common PHY mode (for example, EHT PHY mode in examples in which supported at both of the STAs 115) and a highest common BW (for example, 320 MHz BW in examples in which supported at both of the STAs 115) based on receiving the SDFs indicating supported PHY modes and BWs.

Although not shown in FIG. 1, an STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some examples, the coverage area 110 of an AP 105 may be divided into sectors (also not shown). The WLAN 100 may include APs 105 of different types (for example, metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 125 may include Wi-Fi Direct connections, Wi-Fi Tunneled Direct Link Setup (TDLS) links, and other group connections. STAs 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within WLAN 100.

In some examples, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment (for example, CSMA/CA) because the STAs 115 may not refrain from transmitting on top of each other. A STA 115 whose transmissions are not identifiable, but that is within the same coverage area 110 may be known as a hidden node. CSMA/CA may be supplemented by the exchange of a request-to-send (RTS) packet transmitted by a sending STA 115 (or AP 105) and a clear-to-send (CTS) packet transmitted by the receiving STA 115 (or AP 105). This may alert other devices within range of the sender and receiver not to transmit for the duration of the primary transmission. Thus, RTS/CTS may help mitigate a hidden node problem.

The APs 105 and STAs 115 may function and communicate via respective communication links 120 according to one or more wireless communication protocol standards, for example the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). These standards define the WLAN radio and baseband protocols for the PHY and medium access control (MAC) layers. The APs 105 and STAs 115 transmit and receive wireless communications (hereinafter also referred to as "Wi-Fi communications") to and from one another in the form of PHY protocol data units (PPDUs) (or physical layer convergence protocol (PLCP) PDUs). The APs 105 and STAs 115 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 105 and STAs 115 described herein also may communicate in other frequency bands, such as the 6 GHz band, which may support both licensed and unlicensed communications. The APs 105 and STAs 115 also can be configured to communicate over other frequency bands such as shared licensed frequency bands, in which multiple operators may have a license to operate in the same or overlapping frequency band or bands.

Each of the frequency bands may include multiple subbands or frequency channels. For example, PPDUs conforming to the IEEE 802.11n, 802.11ac, 802.11ax and 802.11be standards may be transmitted over the 2.4, 5 GHz or 6 GHz bands, each of which is divided into multiple 20 MHz channels. As such, these PPDUs are transmitted over a physical channel having a minimum BW of 20 MHz, but larger channels can be formed through channel bonding. For example, PPDUs may be transmitted over physical channels having BWs of 40 MHz, 80 MHz, 160 MHz or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

In some examples, a PPDU may be used for single-user (SU), multi-user orthogonal frequency division multiple access (MU-OFDMA) or multi-user multiple-input multiple-output (MU-MIMO) transmissions. A PPDU may include a PHY preamble including a legacy portion and a non-legacy portion. A PPDU may further include a PHY payload after the preamble, for example, in the form of a PSDU including a DATA field. The legacy portion includes a legacy short training field (L-STF), a legacy long training field (L-LTF), and a legacy signal field (L-SIG). The non-legacy portion of the preamble and the DATA field may be formatted as an EHT WLAN preamble and frame, respectively, in accordance with the IEEE 802.11be amendment to the IEEE 802.11 wireless communication protocol standard, or may be formatted as a preamble and frame, respectively, conforming to any later (post-HE) version of a new wireless communication protocol conforming to a future IEEE 802.11 wireless communication protocol standard or other standard.

In some examples, an AP 105 may communicate with multiple STAs 115 using an EHT PHY mode in accordance with one or more wireless communication protocol standards, such as the IEEE 802.11be amendment to the IEEE 802.11 wireless communication protocol standard. For example, one or more PPDUs may be formatted as described above. Additionally, EHT PHY mode may include 4K quadrature amplitude modulation (QAM) usage, multiple radio unit (RU) aggregation and preamble puncturing, 6 GHz low power indoor (LPI) channel enhancements, multi-link operation (MLO), low latency enhancements, among other features. In some examples, EHT PHY mode communications in accordance with IEEE 802.11be may support 240 MHz and 320 MHz BW operation, and PHY mode communications in accordance with IEEE 802.11ax may support flax PHY rate and 160 MHz BW on 2G, 5G, and 6G bands. EHT PHY mode and 240 MHz or 320 MHz BW operation may enhance user experience through increased throughput and latency between STAs 115 and AP 105. EHT PHY mode and 240 MHz or 320 MHz BW operation may additionally enhance user experience with regard to low-latency applications such as augmented reality (AR) or virtual reality (VR) applications.

Figure 2:
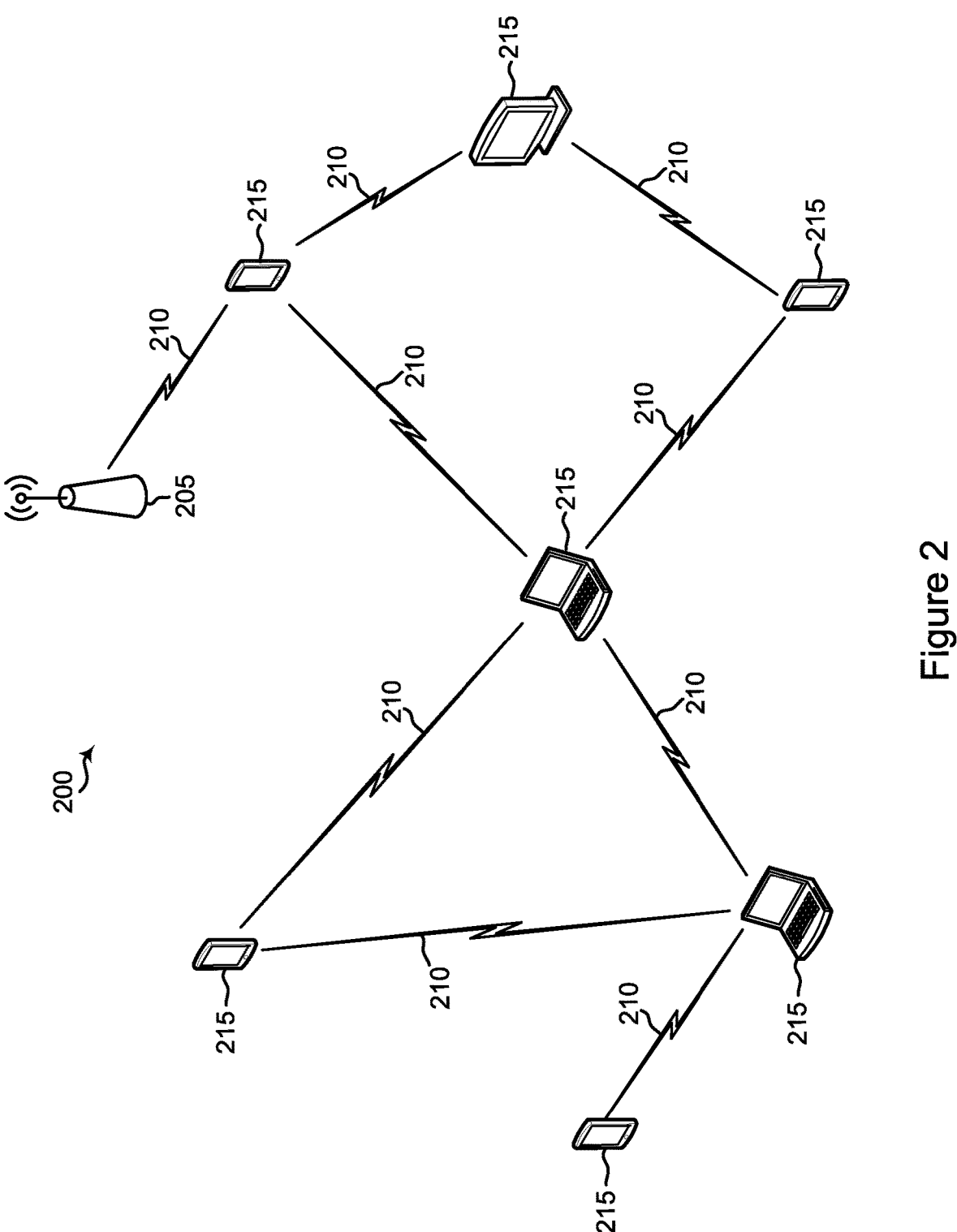

FIG. 2 illustrates an example of a WLAN 200 that supports EHT and high frequency BW support indication in accordance with one or more aspects of the present disclosure. According to some aspects, the WLAN 200 can be an example of a WLAN. For example, the WLAN 200 can be a network implementing at least one of the IEEE 802.11 family of standards. The WLAN 200 may include multiple NAN devices 215, which may be STAs 215. As described above, each of the STAs 215 also may be referred to as a mobile station (MS), a mobile device, a mobile handset, a wireless handset, an access terminal (AT), a user equipment (UE), a subscriber station (SS), or a subscriber unit, among other possibilities. The STAs 215 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

The WLAN 200 is an example of a peer-to-peer (P2P), ad hoc or mesh network. STAs 215 can communicate directly with each other via P2P wireless links 210 (without the use of an intermediary AP). In some implementations, the WLAN 200 is an example of a NAN network. NANs operate in accordance with the Wi-Fi Alliance (WFA) NAN standard specification. NAN-compliant STAs 215 (hereinafter also simply "NAN devices 215") transmit and receive NAN communications (for example, in the form of Wi-Fi packets including frames conforming to an IEEE 802.11 wireless communication protocol standard such as that defined by the IEEE 802.11-2016 specification or amendments thereof including, but not limited to, 802.11ay, 802.11ax, 802.11az, 802.11ba and 802.11be) to and from one another via wireless P2P links 210 (hereinafter also referred to as "NAN links") using a data packet routing protocol, such as Hybrid Wireless Mesh Protocol (HWMP), for path selection.

A NAN network generally refers to a collection of NAN devices that share a common set of NAN parameters including: the time period between consecutive discovery windows, the time duration of the discovery windows, the NAN beacon interval, and the NAN discovery channel(s). A NAN ID is an identifier signifying a specific set of NAN parameters for use within the NAN network. NAN networks are dynamically self-organized and self-configured. NAN devices 215 in the network automatically establish an ad-hoc network with other NAN devices 215 such that network connectivity can be maintained. Each NAN device 215 is configured to relay data for the NAN network such that various NAN devices 215 may cooperate in the distribution of data within the network. As a result, a message can be transmitted from a source NAN device to a destination NAN device by being propagated along a path, hopping from one NAN device to the next until the destination is reached.

Each NAN device 215 is configured to transmit two types of beacons: NAN discovery beacons and NAN synchronization beacons. In examples in which a NAN device 215 is turned on, or otherwise in examples in which NAN-functionality is enabled, the NAN device periodically transmits NAN discovery beacons (for example, every 100 TUs, every 128 TUs or another suitable period) and NAN synchronization beacons (for example, every 512 TUs or another suitable period). Discovery beacons are management frames, transmitted between discovery windows, used to facilitate the discovery of NAN clusters. A NAN cluster is a collection of NAN devices within a NAN network that are synchronized to the same clock and discovery window schedule using a time synchronization function (TSF). To join NAN clusters, NAN devices 215 passively scan for discovery beacons from other NAN devices. In examples in which two NAN devices 215 come within a transmission range of one another, they will discover each other based on such discovery beacons. Respective master preference values determine which of the NAN devices 215 will become the master device. If a NAN cluster is not discovered, a NAN device 215 may start a new NAN cluster. In examples in which a NAN device 215 starts a NAN cluster, it assumes the master role and broadcasts a discovery beacon. Additionally, a NAN device may choose to participate in more than one NAN cluster within a NAN network.

The P2P links 210 between the NAN devices 215 in a NAN cluster are associated with discovery windows—the times and channel on which the NAN devices converge. At the beginning of each discovery window, one or more NAN devices 215 may transmit a NAN synchronization beacon, which is a management frame used to synchronize the timing of the NAN devices within the NAN cluster to that of the master device. The NAN devices 215 may then transmit multicast or unicast NAN SDFs directly to other NAN devices within the service discovery threshold and in the same NAN cluster during the discovery window. The SDFs indicate services supported by the respective NAN devices 215.

In some instances, NAN devices 215 may exchange SDFs to ascertain whether both devices support ranging operations. NAN devices 215 may perform such ranging operations ("ranging") during the discovery windows. The ranging may involve an exchange of fine timing measurement (FTM) frames (such as those defined in IEEE 802.11-REVmc). For example, a first NAN device 215 may transmit unicast FTM requests to multiple peer NAN devices 215. The peer NAN devices 215 may then transmit responses to the first NAN device 215. The first NAN device 215 may then exchange a number of FTM frames with each of the peer NAN devices 215. The first NAN device 215 may then determine a range between itself and each of the peer devices 215 based on the FTM frames and transmit a range indication to each of the peer NAN devices 215. For example, the range indication may include a distance value or an indication as to whether a peer NAN device 215 is within a service discovery threshold (for example, 3 meters (m)) of the first NAN device 215. The NAN links 210 between NAN devices within the same NAN cluster may persist over multiple discovery windows as long as the NAN devices remain within the service discovery thresholds of one another and synchronized to the anchor master of the NAN cluster.

Some NAN devices 215 also may be configured for wireless communication with other networks such as with a Wi-Fi WLAN or a wireless (for example, cellular) wide area network (WWAN), which may, in turn, provide access to external networks including the Internet. For example, a NAN device 215 may be configured to associate and communicate, via a Wi-Fi or cellular link 210, with an AP or base station 205 of a WLAN or WWAN network, respectively. In such instances, the NAN device 215 may include SoftAP functionality enabling the STA to operate as a Wi-Fi hotspot to provide other NAN devices 215 with access to the external networks via the associated WLAN or WWAN backhaul. Such a NAN device 215 (referred to as a NAN concurrent device) is capable of operating in both a NAN network as well as another type of wireless network, such as a Wi-Fi BSS. In some such implementations, a NAN device 215 may, in an SDF, advertise an ability to provide such AP services to other NAN devices 215.

There are two general NAN service discovery messages: publish messages and subscribe messages. Generally, publishing is a mechanism for an application on a NAN device to make selected information about the capabilities and services of the NAN device available to other NAN devices, while subscribing is a mechanism for an application on a NAN device to gather selected types of information about the capabilities and services of other NAN devices. A NAN device may generate and transmit a subscribe message when requesting other NAN devices operating within the same NAN cluster to provide a specific service. For example, in an active subscriber mode, a subscribe function executing within the NAN device may transmit a NAN SDF to actively seek the availability of specific services. A publish function executing within a publishing NAN device capable of providing a requested service may, for example, transmit a publish message to reply to the subscribing NAN device responsive to the satisfaction of criteria specified in the subscribe message. The publish message may include a range parameter indicating the service discovery threshold, which represents the maximum distance at which a subscribing NAN device can avail itself of the services of the publishing NAN device. A NAN also may use a publish message in an unsolicited manner, for example, a publishing NAN device may generate and transmit a publish message to make its services discoverable for other NAN devices operating within the same NAN cluster. In a passive subscriber mode, the subscribe function does not initiate the transfer of any subscribe message, rather, the subscribe function looks for matches in received publish messages to determine the availability of desired services.

Subsequent to a discovery window is a transmission opportunity period. This period includes numerous resource blocks. A NAN device link (NDL) refers to the negotiated resource blocks between NAN devices used for NAN operations. An NDL can include more than one "hop." The number of hops depends on the number of devices between the device providing the service and the device consuming or subscribing to the service. An example of an NDL that includes two hops includes three NAN devices: the provider, the subscriber and a proxy to relay the information between the provider and the subscriber. In such a configuration, the first hop refers to the communication of information between the provider and the proxy, and the second hop refers to the communication of the information between the proxy and the subscriber. An NDL may refer to a subset of NAN devices capable of one-hop service discovery, but an NDL also may be capable of service discovery and subscription over multiple hops (a multi-hop NDL).

There are two general NDL types: paged NDL (P-NDL) and synchronized NDL (S-NDL). Each common resource block (CRB) of a P-NDL includes a paging window (PW) followed by a transmission window (TxW). All NAN devices participating in a P-NDL operate in a state to receive frames during the paging window. Generally, the participating NAN devices wake up during the paging window to listen on the paging channel to determine whether there is any traffic buffered for the respective devices. For example, a NAN device that has pending data for transmission to another NAN device may transmit a traffic announcement message to the other NAN device during the paging window to inform the other NAN device of the buffered data. If there is data available, the NAN device remains awake during the transmission window to exchange the data. If there is no data to send, the NAN device may transition back to a sleep state during the transmission window to conserve power. A NAN device transmits a paging message to its NDL peer during a paging window if it has buffered data available for the peer. The paging message includes, for example, the MAC addresses or identifiers of the destination devices for which data is available. A NAN device that is listed as a recipient in a received paging message transmits a trigger frame to the transmitting device and remains awake during the subsequent transmission window to receive the data. The NDL transmitter device transmits the buffered data during the transmission window to the recipient devices from whom it received a trigger frame. A NAN device that establishes an S-NDL with a peer NAN device may transmit data frames to the peer from the beginning of each S-NDL CRB without transmitting a paging message in advance.

In some examples, NAN devices 215 may communicate using different PHY modes. For example, a NAN device 215 may communicate using high throughput (HT), very high throughput (VHT), or high efficiency (HE) PHY mode in accordance with IEEE 802.11ax amendment and other amendments to wireless communication protocol standards, such as the IEEE 802.11 wireless communication protocol standard, among other PHY modes. A NAN device 215 may also operate according to a 160 MHz BW, among other examples of BWs (for example, 20 MHz, 40 MHz, or 80 MHz). In some examples, a NAN device 215 may indicate PHY mode capability or BW operation capability in an SDF as described with reference to FIG. 3. For example, a NAN device 215 may indicate, in an SDF transmitted to a second NAN device 215, support for 160 MHz BW operation and 11 ax PHY rates, including HE, VHT, and HT PHY modes. However, NAN technical specifications from Wi-Fi Alliance does not currently define NAN operations using nor NAN indication of support for EHT PHY mode, nor 240 MHz or 320 MHz operation.

In some examples, to enable implementing low latency PHY mode and low latency throughput BW support in P2P and NAN communications, a NAN device 215 may indicate support for low latency PHY mode and low latency throughput (for example, for EHT and high frequency BW) in an SDF. For example, multiple NAN devices 215 may form a cluster as part of NAN communications, and may subsequently perform service discovery by exchanging SDFs. A first NAN device 215 may include additional bits in an information element of a MAC header of an SDF transmitted to a second NAN device 215 to indicate support for one or more low latency PHY modes and one or more BWs, including low latency throughput BWs. For example, the additional bits may indicate support for EHT PHY mode and high frequency BWs, in which the MAC header may indicate supported PHY modes and BWs at the first NAN device 215 as described with reference to FIG. 3. The first NAN device 215 may also receive an SDF from the second NAN device 215 indicating similar or different PHY mode and BW support. After exchanging SDFs, the NAN devices 215 may communicate based on the indicated capabilities as described with reference to FIGS. 3 and 4. For example, the NAN devices 215 may establish an NDP using a common PHY mode (for example, EHT PHY mode if supported at both of the STAs 115) and a highest common BW (for example, 320 MHz BW if supported at both of the STAs 115) based on receiving the SDFs indicating supported PHY modes and BWs.

Figure 3:
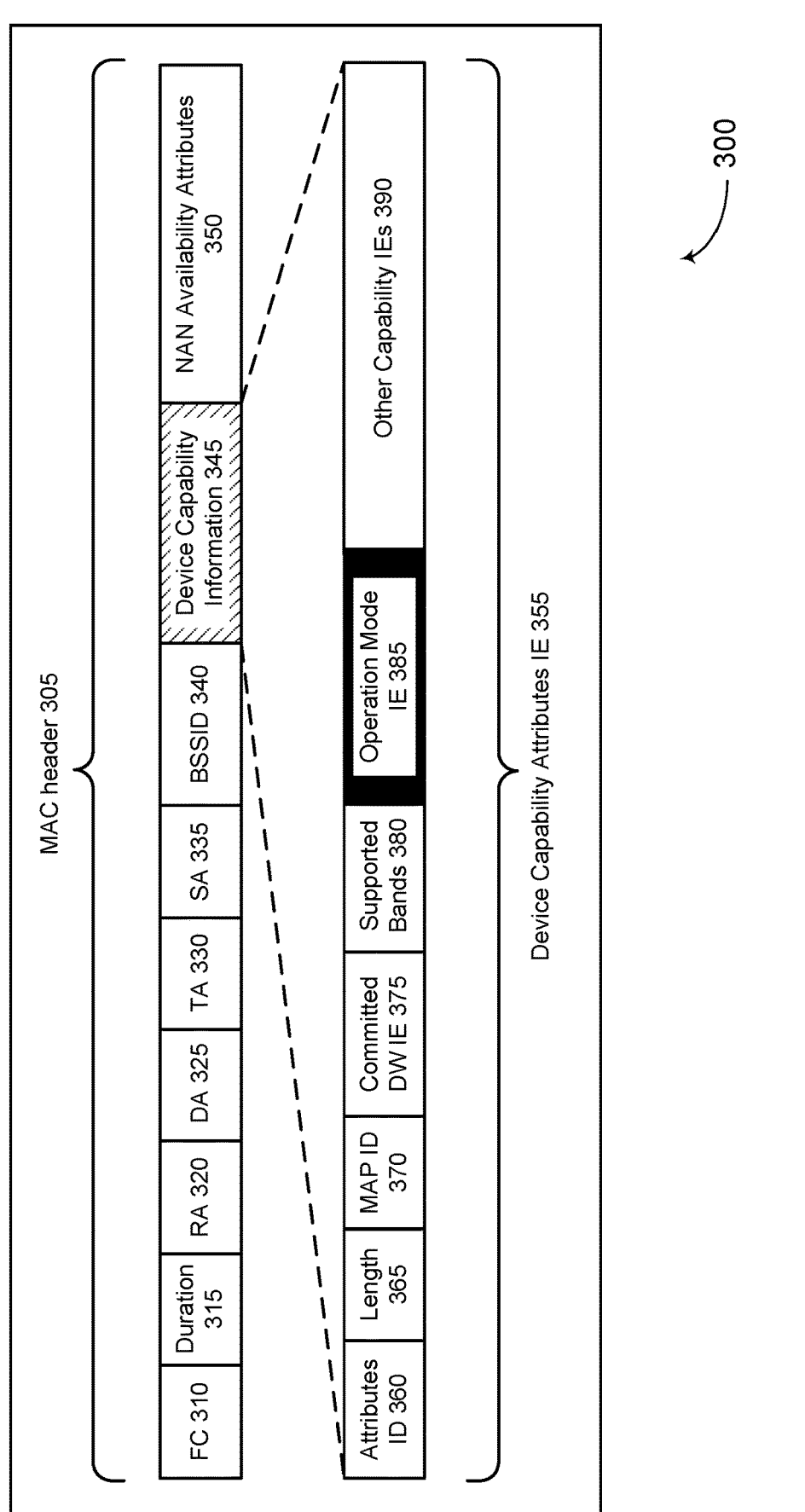
FIG. 3 illustrates a service discovery frame (SDF) that supports EHT and high frequency BW support indication in accordance with one or more aspects of the present disclosure.

FIG. 3 illustrates an example of an SDF 300 that supports EHT and high frequency BW support indication in accordance with one or more aspects of the present disclosure. The SDF 300 may implement or be implemented by one or more aspects of the WLAN 100 or the WLAN 200. For example, the SDF 300 may represent an SDF transmitted by a first NAN device 215 to a second NAN device 215 during a discovery window as described with reference to FIG. 2. In some examples, the first NAN device 215 may transmit the SDF 300 after forming a cluster including the first NAN device 215 and the second NAN device 215, and after transmitting a NAN synchronization beam. In some implementations, the SDF 300 may be an example of a publish message indicating capabilities and services of the first NAN device 215 to the second NAN device 215 or other NAN devices 215. In some examples, the first NAN device 215 and the second NAN device 215 may both transmit a respective SDF 300 as a publish message, in which both the first NAN device 215 and the second NAN device 215 may be publishing NAN devices. Additionally, or alternatively, the second NAN device 215 or other NAN devices 215 may respond to the SDF 300 with a subscribe message as described with reference to FIG. 2. In some examples, the first NAN device 215 may be an advertising or publishing NAN device, and the second NAN device 215 may be a subscribing NAN device as described with reference to FIG. 2. Additionally, or alternatively, the SDF 300 may be a subscribe message as described with reference to FIG. 2, or may represent another management frame or beacon in NAN processes.

In some examples, the SDF 300 may include a MAC header 305. In some examples, the MAC header 305 may include address information, capability information, and other data corresponding to the first NAN device 215 and data within the SDF 300. For example, the MAC header 305 may include a frame control (FC) 310, a duration 315, a receiver address (RA) 320, a destination address (DA) 325, a transmitter address (TA) 330, a source address (SA) 335, a BSS identifier (BSSID) 340, device capability information 345, and NAN availability attributes 350. In some examples, the MAC header 305 may include other examples of data.

In some examples, the device capability information 345 may include multiple information elements (IE). For example, the device capability information 345 may include a device capability attributes IE 355, which may contain multiple IEs and other indications defining different capabilities of the first NAN device 215. For example, the device capability attributes IE 355 may include an attributes ID 360, a length 365, a MAP ID 370, a committed demand-wakeup (DW) IE 375, supported bands 380, an operation mode IE 385, and other capability IEs 390. In some examples, the other capability IEs 390 may include additional capabilities for an antenna of the NAN device 215, an SCID, keys, or other capability IEs.

In some examples, the operation mode IE 385 may include multiple subfields and multiple bits to indicate PHY mode capabilities, BW capabilities, among other examples of capabilities of the first NAN device 215. The subfields of the operation mode IE 385, including respective definitions, may be further described according to Table 1 below, which may represent the corresponding bit fields of the operation mode IE 385 as defined in the WFA NAN standard specification.

TABLE 1

| Subfield | Size (bits) | Value | Description |
|---|---|---|---|
| PHY Mode | b0, b4 | Variable | b0 = 1: VHT |
| | | | b0 = 0: Not Supported |
| | | | b4 = 1: HE |
| | | | b4 = 0: Not Supported |
| HE/VHT 80 + 80 | b1 | Variable | b1 = 1: HE/VHT 80 + 80 |
| | | | b1 = 0: Not Supported |
| HE/VHT 160 | b2 | Variable | b2 = 1: HE/VHT 160 |
| | | | b2 = 0: Not Supported |
| Reserved (Paging NDL Support) | b3 | Variable | b3 = 1: P-NDL |
| | | | b3 = 0: Not Supported |
| Reserved | b5-b7 | Variable | Reserved |

As shown in Table 1, the operation mode IE 385 may include 8 bits, including bits b0-b7, which may each represent a variable value. In some examples, b0 and b4 may indicate supported PHY Modes at the first NAN device 215. For example, b0 may indicate support for VHT PHY mode. If b0 is equal to 1, b0 may indicate that the first NAN device 215 supports VHT PHY mode and HT PHY mode, and if b0 is equal to 0, b0 may indicate that the first NAN device 215 does not support VHT PHY mode, but supports HT PHY mode. In some examples, b1 may indicate support for HE PHY mode. For example, if b4 is equal to 1, b4 may indicate support for HE PHY mode, and if b4 is equal to 0, b4 may indicate that HE PHY mode is not supported at the first NAN device 215. In some implementations, if b4 is equal to 1 and indicates support for HE PHY mode, b4 may also indicate support for VHT and HT PHY modes as well. In some examples, if b4 is equal to 0, b4 may be a reserved bit (for example, for current or future use for another indication).

In some examples, the bits b1 and b2 may indicate support for different BWs at the first NAN device 215. For example, b1 may indicate support for 80 MHz BW (or a BW based on an 80 MHz granularity) in HE and VHT PHY mode, in which if b1 is equal to 1, b1 indicates support for 80 MHz operation (or a BW based on an 80 MHz granularity) in both HE and VHT PHY mode, and if b1 is equal to 0, b1 indicates that 80 MHz operation (or a BW based on an 80 MHz granularity) is not supported in HE or VHT PHY modes. Additionally, or alternatively, b2 may indicate support for 160 MHz BW operation in both HE and VHT PHY modes, in which if b2 is equal to 1, b2 may indicate support for 160 MHz BW operation in both HE and VHT PHY modes, and if b2 is equal to 0, b2 may indicate that 160 MHz operation is not supported in HE or VHT PHY modes at the first NAN device 215. In some examples, if b2 is equal to 0, b2 may indicate support for 80 MHz operation or lower, and if b1 is equal to 0, b1 may indicate support for lower than 80 MHz BW operation.

In some examples, b1 and b2 may indicate a BW, such as a highest supported BW. For example, b2 and b1 may be dependent on each other, in which if b2 is equal to 1 and b1 is equal to 0, the bits may indicate support for 160 MHz BW operation or lower frequency BWs, and if b2 is equal to 0 and b1 is equal to 1, the bits may indicate support for 80 MHz BW operation and lower frequency BWs. Additionally, or alternatively, each bit may be independent and may separately indicate support for a specific BW. For example, if b2 is equal to 1 and b1 is equal to 1, b2 may indicate support for 160 MHz BW operation, and b1 may indicate support for 80 MHz BW operation. By way of another example, the bits b1 and b2 may be redundant and indicate a maximum BW, in which case if b2 is equal to 1 and b1 is equal to 1, b2 may indicate support for 160 MHz BW operation and lower frequency BWs, and b1 may indicate support for 80 MHz BW operation and lower frequency BWs. Other bits in the operation mode IE 385 or the MAC header 305 may also depend on other bits or be independent or redundant.

In some examples, b3 may be reserved for indicating P-NDL support at the NAN device 215 (for example, for supporting P-NDL communication as described with reference to FIG. 2). For example, if b3 is equal to 1, b3 may indicate support for P-NDL communication, and if b3 is equal to 0, b3 may indicate that P-NDL communication is not supported. In some implementations, if b3 is equal to 0, b3 may indicate support for S-NDL communication. Additionally, or alternatively, if b3 is equal to 1, b3 may indicate support for both P-NDL communication and S-NDL communication. By way of another example, if b3 is equal to 1, b3 may indicate support for P-NDL communication and a lack of support for S-NDL communication. In some examples, b5-b7 may be reserved bits. For example, b5-b7 may be reserved for other functions or indications, or may not include current definitions in the WFA NAN standard specification.

In some examples, the first NAN device 215 and the second NAN device 215 may use the SDF 300 and other SDFs 300 to determine an appropriate configuration for NAN communications. For example, the first NAN device

215 may transmit the SDF 300 to a second NAN device 215 including device capabilities of the first NAN device 215 (for example, in the operation mode IE 385 of the MAC Header 305), and may receive a second SDF 300 from the second NAN device 215 including device capabilities of the second NAN device 215. Based on the indicated capabilities, the first NAN device 215 and the second NAN device 215 may select a common PHY mode and BW, and may establish an NDP using the selected PHY mode and BW as described with reference to FIG. 4. For example, the first NAN device 215 and the second NAN device 215 may both support 160 MHz operation and HE/VHT PHY modes, may indicate such support in the SDF 300 and a second SDF 300, and may establish an NDP using 160 MHz and HE/VHT PHY mode based on the SDF 300 and the second SDF 300. However, in some examples, the current definitions of the WFA NAN standard specification may lack indication of support for BWs higher than 160 MHz such as 240 MHz or 320 MHz, as well as lack indication of support for EHT PHY mode in the operation mode IE 385 of the MAC header 305.

As described with reference to FIG. 3, the SDF 300 may support techniques for implementing EHT and high frequency BW support indication, and more specifically, to indicating support for low latency PHY modes (for example, EHT PHY mode) and low latency throughput BWs (for example, high frequency BWs) in the SDF 300 for NAN communications. For example, the operation mode IE 385 of the device capability attributes IE 355 of the MAC header 305 may include additional subfields and may utilize reserved bits to indicate support for EHT PHY mode, as well as support for 240 MHz or 320 MHz BW operations. The previously reserved bits b5-b7 of Table 1 may represent additional subfields and indications of the operation mode IE 385, including respective definitions as further described according to Table 2 below.

TABLE 2

| Subfield | Size (bits) | Value | Description |
|---|---|---|---|
| PHY Mode | b0, b4, b5 | Variable | b0 = 1: VHT |
| | | | b0 = 0: Not Supported |
| | | | b4 = 1: HE |
| | | | b4 = 0: Reserveda |
| | | | b5 = 1: EHT |
| | | | b5 = 0: Not Supported |
| HE/VHT 80 + 80 | b1 | Variable | b1 = 1: HE/VHT 80 + 80 |
| | | | b1 = 0: Not Supported |
| HE/VHT 160 | b2 | Variable | b2 = 1: HE/VHT 160 |
| | | | b2 = 0: Not Supported |
| EHT 320 | b6 | Variable | b6 = 1: EHT 320 |
| | | | b6 = 0: Not Supported |
| Reserved (Paging NDL Support) | b3 | Variable | b3 = 1: P-NDL |
| | | | b3 = 0: Not Supported |
| EHT 240 | b7 | Variable | b7 = 1: EHT 240 |
| | | | b7 = 0: Not Supported |

As shown in Table 2, the operation mode IE 385 may include additional subfields using the previously-reserved bits b5-b7. In some examples, PHY mode support may also be indicated in the bit b5, which may indicate support for low latency PHY modes, such as EHT PHY mode, at the first NAN device 215. For example, if b5 is equal to 1, b5 may indicate that the first NAN device 215 supports EHT PHY mode. In some implementations, if b5 is equal to 1, b5 may indicate support for EHT PHY mode as well as HE, VHT, and HT PHY modes. If b5 is equal to 0, b5 may indicate that EHT PHY mode is not supported, and may indicate that either HE, VHT, or HT PHY modes are supported. In some examples, if b5 is equal to 0, b5 may be a reserved bit (for example, for use for another indication). Additionally, or alternatively, b0, b4, or b5 may indicate support for any low latency PHY mode, low latency wireless mode, or other PHY mode or wireless mode. For example, b5 may indicate support for a PHY mode with lower latency or higher throughput than EHT PHY mode.

In some examples, the bits b6 and b7 may indicate support for low latency throughput BWs, such as high frequency BWs, at the first NAN device 215. For example, b6 may indicate support for 320 MHz BW in EHT PHY mode, in which if b6 is equal to 1, b6 indicates support for 320 MHz operation in EHT PHY mode, and if b6 is equal to 0, b6 indicates that 320 MHz operation is not supported in EHT PHY modes (or supported in any PHY mode) at the first NAN device 215. Additionally, or alternatively, b7 may indicate support for 240 MHz BW operation in EHT PHY modes, in which if b7 is equal to 1, b7 may indicate support for 240 MHz BW operation in EHT PHY mode, and if b7 is equal to 0, b7 may indicate that 240 MHz operation is not supported in EHT PHY mode (or supported in any PHY mode) at the first NAN device 215. Additionally, or alternatively, b6 or b7 may indicate support for any low latency throughput BW. For example, b7 (or b6) may indicate support for a BW with a frequency higher than 320 MHz.

In some examples, b6 and b7 may indicate a highest supported BW. For example, b6 and b7 may be dependent on each other, in which if b6 is equal to 1 and b7 is equal to 0, the bits may indicate support for 320 MHz BW operation or lower frequency BWs, and if b6 is equal to 0 and b7 is equal to 1, the bits may indicate support for 240 MHz and lower frequency BWs (for example, 160 MHz and 80 MHz BW operation). Additionally, or alternatively, each bit may be independent from each other and may separately indicate support for a specific BW. For example, if b6 is equal to 1 and b7 is equal to 1, b6 may indicate support for 320 MHz BW operation, and b7 may indicate support for 240 MHz BW operation. By way of another example, the bits b6 and b7 may be redundant and indicate a highest BW, in which if b6 is equal to 1 and b7 is equal to 1, b6 may indicate support for 320 MHz BW operation and lower frequency BWs, and b7 may indicate support for 240 MHz BW operation and lower frequency BWs. Other bits in the operation mode IE 385 or the MAC header 305 may also depend on other bits or be independent or redundant (for example, the bits b1 and b2).

In some examples, the first NAN device 215 and the second NAN device 215 may use the SDF 300 and other SDFs 300 to determine an appropriate configuration for NAN communications as described above and with reference to FIG. 4. For example, the first NAN device 215 and the second NAN device 215 may both support EHT PHY mode and 320 MHz BW operation, may indicate support in the SDF 300 and a second SDF 300, and may establish an NDP using 320 MHz and EHT PHY mode based on the SDF 300 and the second SDF 300 as described with reference to FIG. 4. In some examples, if the SDF 300 or the second SDF 300 indicates lack of support for 320 MHz, the two NAN devices 215 may select a highest common BW (for example, 240 MHz if both of the NAN devices 215 support 240 MHz BW operation). Additionally, or alternatively, if the SDF 300 or the second SDF 300 indicates a lack of support for EHT PHY mode, the two NAN devices 215 may select a common PHY Mode. In some examples, the first NAN device 215 and the second NAN device 215 may establish an NDP based on the selected common PHY mode and the highest common BW. In some examples, establishing an NDP using low latency PHY modes and low latency throughput BWs, such as EHT PHY mode and 240 MHz or 320 MHz BW operation, may increase throughput and reduce latency and power, resulting in increased performance at the first NAN device 215 and the second NAN device 215.

Figure 4:
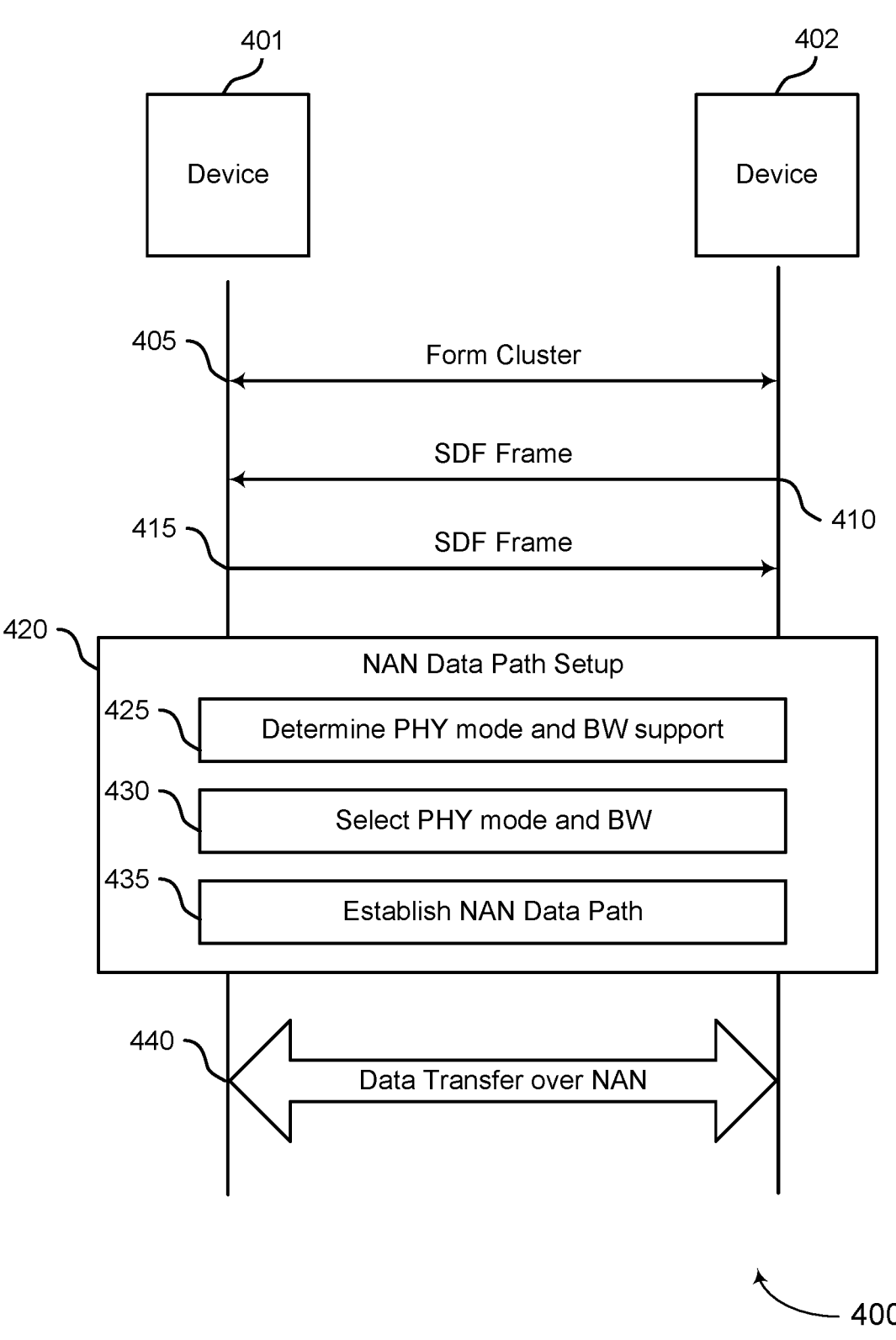
FIG. 4 illustrates an example of a process flow that supports EHT and high frequency BW support indication in accordance with one or more aspects of the present disclosure.

FIG. 4 illustrates an example of a process flow 400 that supports EHT and high frequency BW support indication in accordance with one or more aspects of the present disclosure. The process flow 400 may implement or be implemented by one or more aspects of the WLAN 100, the WLAN 200, or the SDF 300. For example, the process flow 400 may represent NAN communications between a first device 401 and a second device 402, in which the first device 401 and the second device 402 may represent various wireless devices (for example, STAs, APs, mobile devices, among other examples) as described with reference to FIGS. 1-3. For example, the first device 401 may represent a first NAN device 215 and the second device 402 may represent a second NAN device 215 (for example, NAN peers) in a NAN network as described with reference to FIG. 3. In some examples, the first device 401 and the second device 402 may both be publishing NAN devices, and may both transmit publish SDFs to each other. In some implementations, the first device 401 may be an advertising or publishing NAN device, and the second device 402 may be a subscribing NAN device, or vice-versa, as described with reference to FIG. 2.

At 405, the first device 401 may establish a wireless communication link with the second device 402. For example, the first device 401 and the second device 402 may transmit and/or scan for discovery beacons, and may establish and/or join a NAN cluster including the first device 401 and the second device 402 as described with reference to FIG. 2. In some implementations, the first device 401 may scan for NAN clusters, and may assume a master role and broadcast a discovery beacon to establish a NAN cluster based on not detecting NAN clusters, in which the second device 402 may scan for the discovery beacon and may join the NAN cluster. Additionally, or alternatively, the second device 402 may assume a master role and broadcast a discovery beacon, or both the first device 401 and the second device 402 may both join an existing NAN cluster. In some examples, the NAN cluster may be on a 2G, 5G, or 6G band.

At 410, the second device 402 may transmit, and the first device 401 may receive, a first message indicating PHY mode capabilities and BW capabilities of the second device 402. For example, the second device 402 may transmit an SDF as a first message including a MAC header, in which the MAC header may include an IE (for example, an operation mode IE of a NAN device capability attributes IE) indicating PHY mode and BW capabilities as described with reference to FIG. 3. In some examples, the IE may indicate that the second device 402 is capable of communicating using a first PHY mode and a first BW. In some examples, the first PHY mode may be a low latency PHY mode (for example, having a first latency below a first threshold). In some implementations, the first PHY mode may be an EHT PHY mode. Additionally or alternatively, the first BW may be a BW supported by the first PHY mode, in which the first BW may have a low latency throughput (for example, the BW may have a high frequency and a throughput with a second latency below a second threshold). In some examples, the IE may include multiple bits (for example, the bits b0-b7) indicating supported PHY modes (for example, EH, HT, VHT, and EHT or other low latency PHY modes) and supported BWs (for example, 320 MHz, 240 MHz, 160 MHz, 80 MHz, and lower or higher frequency BWs) as described with reference to FIG. 3. In some implementations, one of the bits may indicate the first PHY mode and one of the bits may indicate the first BW. For example, an operation mode IE may include reserved bits b5-b7, in which b5 may equal 1 to indicate EHT PHY mode support, and b6 may equal 1 to indicate 320 MHz BW operation support, and b7 may equal 1 to indicate 240 MHz BW operation support. In some implementations, the first BW may indicate a maximum supported BW for the second device 402 as described with reference to FIG. 3. In some examples, the first BW may be 320 MHz or 240 MHz, or another BW (for example, a low latency throughput BW) supported by the first PHY mode or another PHY mode (for example, 160 MHz, which may be supported by EHT PHY mode)

At 415, the first device 401 may transmit, and the second device 402 may receive, a second message indicating PHY mode capabilities and BW capabilities of the first device 401. For example, the first device 401 may transmit an SDF as a second message including a MAC header, in which the MAC header may include an IE indicating whether the first device 401 is capable of communicating using the first PHY mode and the first BW. In some examples, the IE of the second message may include multiple bits (for example, the bits b0-b7) indicating supported PHY modes (for example, EH, HT, VHT, and EHT PHY modes or other low latency PHY modes) and supported BWs (for example, 320 MHz, 240 MHz, 160 MHz, 80 MHz, and lower BWs or low latency throughput BWs) as described with reference to FIG. 3, in which one of the bits may indicate whether or not the first device 401 supports the first PHY mode and one of the bits may indicate whether or not the first device 401 supports the first BW. In some implementations, the first message and the second message may both be publish messages as described with reference to FIG. 2. Additionally, or alternatively, the first message and the second message may be subscribe messages, or may represent other beacons or messages, as well as other capability indications.

At 420, the first device 401 and the second device 402 may perform NDP setup based on the first message and the second message. For example, after forming the cluster at 405 and exchanging SDFs at 410 and 415, the first device 401 and the second device 402 may determine supported PHY modes and BWs at 425 based on the first message and the second message (for example, by comparing bits in the MAC headers of the exchanged SDFs). The first device 401 and the second device 402 may select a second PHY mode and a second BW at 430 based on the determination, and may establish an NDP at 435 using the selected second PHY mode and second BW. In some examples, the second PHY mode and the second BW may be the same as the first PHY mode and the first BW, respectively. Additionally, or alternatively, the second PHY mode and the second BW may be different than the first PHY mode and the first BW, respectively.

In some examples, the first device 401 and the second device 402 may determine whether or not the first device 401 and the second device 402 are capable of communicating using the first PHY mode (for example, EHT PHY mode or another low latency PHY mode) and using the first BW (for example, 240 MHz or 320 MHz, or another low latency throughput BW). For example, the first device 401 and the second device 402 may determine that the first device 401 and the second device 402 are capable of communicating using the first PHY mode (for example, EHT PHY mode) and the first BW (for example, 320 MHz) based on both the first message and the second message indicating support for the first PHY mode and the first BW at the first device 401 and the second device 402. After the determination, the first device 401 and the second device 402 may both select the first PHY mode and the first BW (for example, may select EHT PHY mode and 320 MHz) at 430. In some implementations, the first device 401 and the second device 402 may determine that one of the devices (for example, the first device 401) does not support 320 MHz, but supports 240 MHz, and may select 240 MHz and EHT PHY mode based on the determination. In some examples, the first device 401 and the second device 402 may establish an NDP at 435 using the selected first PHY mode (EHT PHY mode) and the first BW (240 MHz or 320 MHz) as described with reference to FIGS. 2 and 3.

Additionally, or alternatively, the first device 401 and the second device 402 may determine that either the first device 401 or the second device 402 is not capable of communicating using the first PHY mode and the first BW (for example, both EHT PHY mode and 320 MHz or 240 MHz, or another low latency PHY mode and supported low latency throughput BW) based on the first message. For example, the first device 401 may transmit an SDF with a b5 equal to 0, a b6 equal to 0, a b7 equal 0, or any combination thereof, indicating lack of support for EHT PHY mode, 320 MHz, or 240 MHz, respectively. In some examples, the second device 402 may transmit an SDF with a b5 equal to 1, a b6 equal to 1, and a b7 equal to 1, indicating support for EHT PHY mode as well as 320 MHz BW operation and lower frequency BW support. After the determination, the first device 401 and the second device 402 may both select a third PHY mode and a third BW at 430 based on the determining. In some examples, if one of the devices does not support EHT (or another low latency PHY mode) and 320 MHz (or 240 MHz or another low latency throughput BW) BW operation, the first device 401 and the second device 402 may revert to 405 to form a cluster with another device that does support EHT and 320 MHz (or 240 MHz) BW operation. Additionally, or alternatively, the devices may revert to 410 and 415 to exchange SDFs with each other or other devices in the NAN cluster.

In some examples, after determining lack of support for the first PHY mode, the first device 401 and the second device 402 may select a common PHY mode for NAN communications. For example, the first device 401 and the second device 402 may determine a common PHY mode based on the first message and the second message, and may select the common PHY mode based on the determining. In some examples, the first device 401 and the second device 402 may both include the bits b0 equal to 1 and b4 equal to 0, indicating support for VHT PHY mode and lack of support for HE PHY mode, and may select VHT PHY mode based on the bits. In some examples, the first device 401 and the second device 402 may determine and select a highest throughput or lowest latency PHY mode (for example, may select VHT PHY mode if VHT is supported and EHT is not supported at both devices, or may select HT PHY mode if HT is supported and VHT and EHT are not supported at both devices).

Additionally, or alternatively, after determining lack of support for the first BW, the first device 401 and the second device 402 may select a highest common BW based on the first message and the second message. For example, the first device 401 may include, in the second message, the bits b2 equal to 1, b6 equal to 0, and b7 equal to 0, indicating support for 160 MHz operation and lower frequency BWs, and the second device 402 may include, in the first message, the bits b2 equal to 1, b6 equal to 1, and b7 equal to 1, indicating support for 320 MHz BW operation and lower frequency BWs. Based on the bits in the first and second message, the first device 401 and the second device 402 may select 160 MHz BW operation as the highest common BW. In some examples, the first device 401 and the second device 402 may select 240 MHz BW operation if both devices support EHT PHY mode, the first device 401 supports up to 240 MHz operation (for example, includes b6 equal to 0 and b7 equal to 1 in the second message), and the second device 402 supports up to 320 MHz operation (for example, includes b6 equal 1 and b7 equal to 1 in the first message).

In some implementations, the first device 401 and the second device 402 may not select 240 MHz BW operation or 320 MHz BW operation based on one or both devices not supporting EHT PHY mode (or another low latency PHY mode). Additionally, or alternatively, the first device 401 and the second device 402 may support 240 MHz or 320 MHz BW operation in other PHY modes. In some examples, the devices may revert to 405, 410, or 415 based on not sharing a common PHY mode or a highest common BW, or based on a lowest BW threshold. For example, if the first device 401 does not support VHT and 160 MHz BW operation, the second device 402 may revert to 405 or 410 based on a lowest BW threshold of 160 MHz and may search for another device that supports VHT at 160 MHz BW operation or higher frequency BWs and EHT operation.

At 435, establishing an NDP may include establishing an NDL as described with reference to FIG. 1. For example, the first device 401 and the second device 402 may establish a P-NDL or an S-NDL using a common PHY mode and a highest common BW. In some examples, the NDL between the first device 401 and the second device 402 within the same NAN cluster may persist over multiple discovery windows as described with reference to FIG. 2. By way of another example, the first device 401 and the second device 402 may establish a new NDP (for example, an NDL) using a new PHY mode or BW based on a decrease in power, beginning a new service discovery window, or multiple configurations or additional messages, by repeating the processes from 405 through 435.

At 440, the first device 401 and the second device 402 may communicate data using a selected PHY mode and BW (for example, the first, second, or third PHY mode and BWs). For example, after establishing an NDP using a common PHY mode and a highest common BW, the first device 401 and the second device 402 may transfer data over the NDP. In some examples, the first device 401 and the second device 402 may communicate using EHT PHY mode and 320 MHz or 240 MHz BW operation based exchanging indications in IEs of SDFs at 410 and 415. Additionally, or alternatively, the first device 401 and the second device 402 may communicate using another low latency PHY mode (or other wireless mode) and a supported low latency through-put BW. In some examples, communicating using a low latency PHY mode (for example, EHT PHY mode) and a low latency throughput BW (for example, 320 MHz or 240 MHz BW operation) may enable high throughput for data transfer, which may result in lower network latency for the NAN network, more robust communication, lower power usage, and enhanced user experience.

Figure 5:
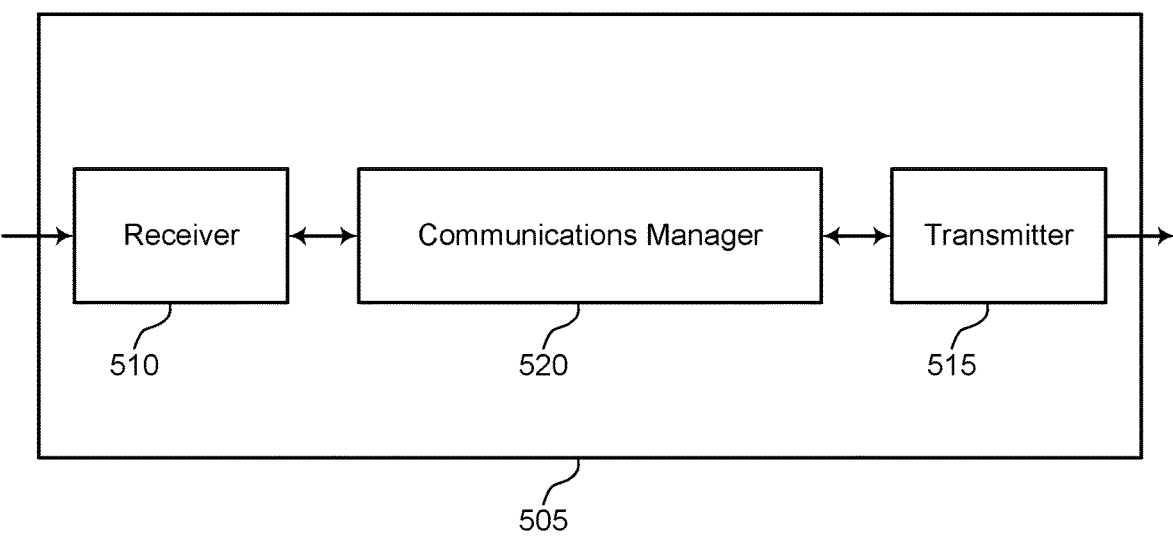
FIGS. 5 and 6 show block diagrams of devices that support EHT and high frequency BW support indication in accordance with one or more aspects of the present disclosure.

FIG. 5 shows a block diagram of a device 505 that supports EHT and high frequency BW support indication in accordance with one or more aspects of the present disclosure. The device 505 may be an example of aspects of an STA as described herein. The device 505 may include a receiver 510, a transmitter 515, and a communications manager 520. The communications manager 520 can be implemented, at least in part, by one or both of a modem and a processor. Each of these components may be in communication with one another (for example, via one or more buses).

The receiver 510 may provide a means for receiving information such as packets, user data, control information, or any combination thereof associated with various information channels (for example, control channels, data channels, information channels related to EHT and high frequency BW support indication). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (for example, control channels, data channels, information channels related to EHT and high frequency BW support indication). In some examples, the transmitter 515 may be co-located with a receiver 510 in a transceiver component. The transmitter 515 may utilize a single antenna or a set of multiple antennas.

The communications manager 520, the receiver 510, the transmitter 515, or various combinations thereof or various components thereof may be examples of means for performing various aspects of EHT and high frequency BW support indication as described herein. For example, the communications manager 520, the receiver 510, the transmitter 515, or various combinations or components thereof may support a method for performing one or more of the functions described herein.

Additionally, or alternatively, in some examples, the communications manager 520, the receiver 510, the transmitter 515, or various combinations or components thereof may be implemented in code (for example, as communications management software or firmware) executed by a processor. If implemented in code executed by a processor, the functions of the communications manager 520, the receiver 510, the transmitter 515, or various combinations or components thereof may be performed by a general-purpose processor, a digital signal processor (DSP), a central processing unit (CPU), an application-specific integrated circuit (ASIC), a field-programmable gate array (FPGA), a microcontroller, or any combination of these or other programmable logic devices (for example, configured as or otherwise supporting a means for performing the functions described in the present disclosure).

In some examples, the communications manager 520 may be configured to perform various operations (for example, receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a first wireless device in accordance with examples as disclosed herein. For example, the communications manager 520 may be configured as or otherwise support a means for establishing a wireless communication link with a second wireless device. The communications manager 520 may be configured as or otherwise support a means for receiving, from the second wireless device, a first message based on establishing the wireless communication link, the first message indicating that the second wireless device is capable of communicating using a first PHY mode having a first latency below a first threshold and a first BW associated with a throughput having a second latency below a second threshold. The communications manager 520 may be configured as or otherwise support a means for selecting a second PHY mode and a second BW based on receiving the first message. The communications manager 520 may be configured as or otherwise support a means for communicating data with the second wireless device using the second PHY mode and the second BW.

By including or configuring the communications manager 520 in accordance with examples as described herein, the device 505 (for example, a processor controlling or otherwise coupled with the receiver 510, the transmitter 515, the communications manager 520, or a combination thereof) may support techniques for exchanging rich-data between multiple peers based on higher throughput using EHT PHY mode and high frequency BWs, which may result in reduced latency, in turn increasing power saving.

Figure 6:
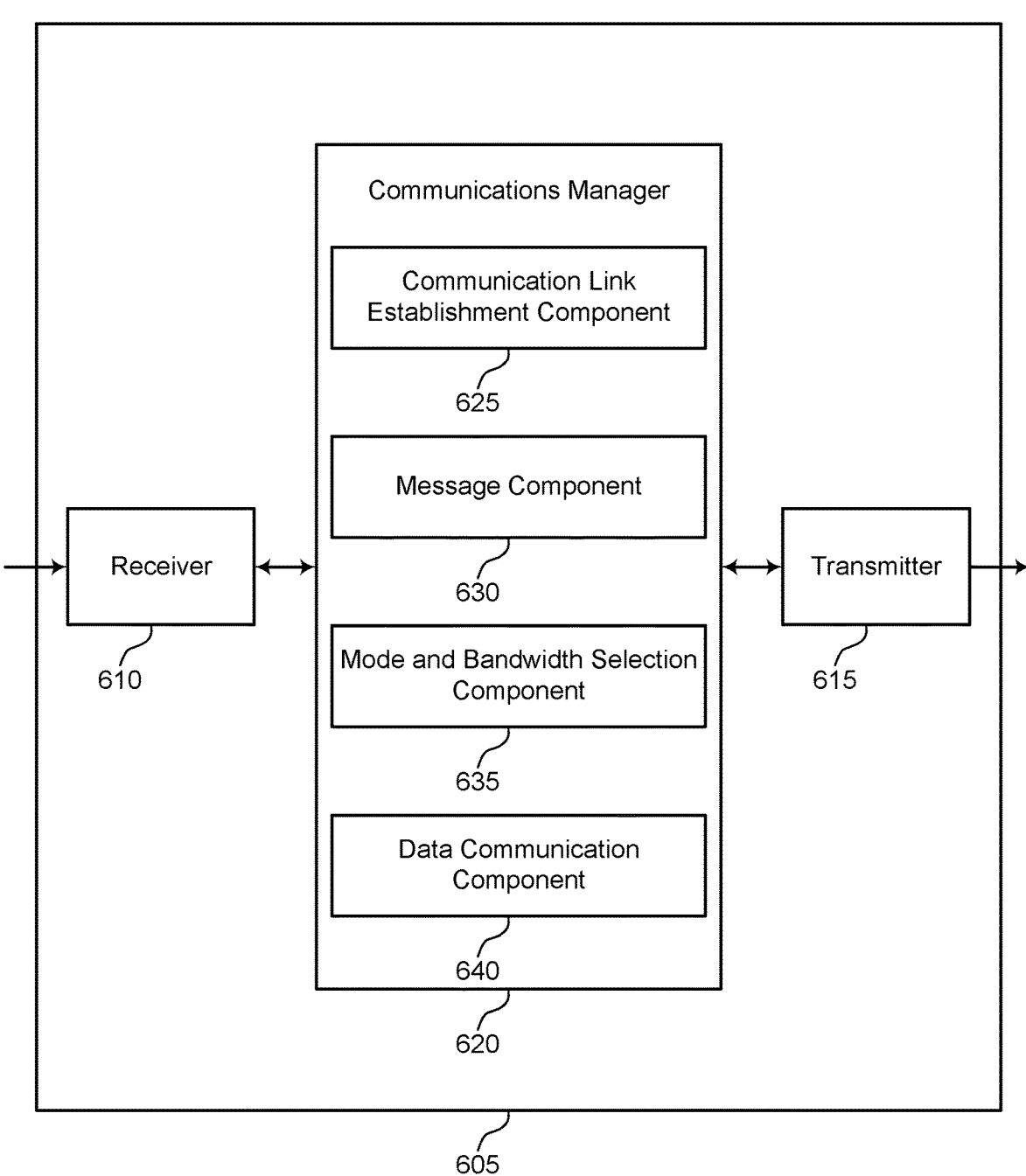

FIG. 6 shows a block diagram of a device 605 that supports EHT and high frequency BW support indication in accordance with one or more aspects of the present disclosure. The device 605 may be an example of aspects of a device 505 or an STA 115 as described herein. The device 605 may include a receiver 610, a transmitter 615, and a communications manager 620. The communications manager 620 can be implemented, at least in part, by one or both of a modem and a processor. Each of these components may be in communication with one another (for example, via one or more buses).

The receiver 610 may provide a means for receiving information such as packets, user data, control information, or any combination thereof associated with various information channels (for example, control channels, data channels, information channels related to EHT and high frequency BW support indication). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (for example, control channels, data channels, information channels related to EHT and high frequency BW support indication). In some examples, the transmitter 615 may be co-located with a receiver 610 in a transceiver component. The transmitter 615 may utilize a single antenna or a set of multiple antennas.

The device 605, or various components thereof, may be an example of means for performing various aspects of EHT and high frequency BW support indication as described herein. For example, the communications manager 620 may include a communication link establishment component 625, a message component 630, a mode and BW selection component 635, a data communication component 640, or any combination thereof. In some examples, the communications manager 620, or various components thereof, may be configured to perform various operations (for example, receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first wireless device in accordance with examples as disclosed herein. The communication link establishment component 625 may be configured as or otherwise support a means for establishing a wireless communication link with a second wireless device. The message component 630 may be configured as or otherwise support a means for receiving, from the second wireless device, a first message based on establishing the wireless communication link, the first message indicating that the second wireless device is capable of communicating using a first PHY mode having a first latency below a first threshold and a first BW associated with a throughput having a second latency below a second threshold. The mode and BW selection component 635 may be configured as or otherwise support a means for selecting a second PHY mode and a second BW based on receiving the first message. The data communication component 640 may be configured as or otherwise support a means for communicating data with the second wireless device using the second PHY mode and the second BW.

Figure 7:
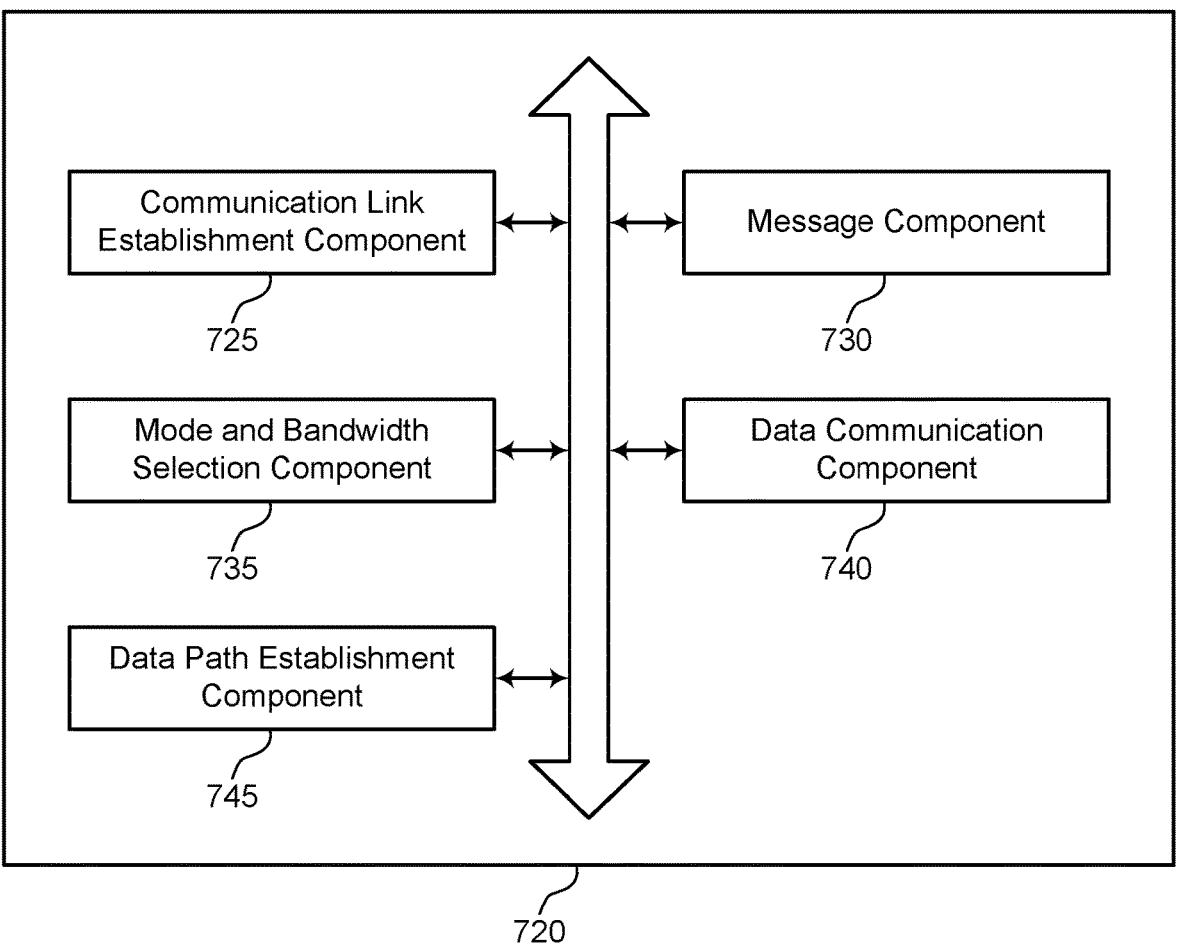
FIG. 7 shows a block diagram of a communications manager that supports EHT and high frequency BW support indication in accordance with one or more aspects of the present disclosure.

FIG. 7 shows a block diagram of a communications manager 720 that supports EHT and high frequency BW support indication in accordance with one or more aspects of the present disclosure. The communications manager 720, or various components thereof, may be an example of means for performing various aspects of EHT and high frequency BW support indication as described herein. For example, the communications manager 720 may include a communication link establishment component 725, a message component 730, a mode and BW selection component 735, a data communication component 740, a data path establishment component 745, or any combination thereof. Each of these components may communicate, directly or indirectly, with one another (for example, via one or more buses).

The communications manager 720 may support wireless communication at a first wireless device in accordance with examples as disclosed herein. The communication link establishment component 725 may be configured as or otherwise support a means for establishing a wireless communication link with a second wireless device. The message component 730 may be configured as or otherwise support a means for receiving, from the second wireless device, a first message based on establishing the wireless communication link, the first message indicating that the second wireless device is capable of communicating using a first PHY mode having a first latency below a first threshold and a first BW associated with a throughput having a second latency below a second threshold. The mode and BW selection component 735 may be configured as or otherwise support a means for selecting a second PHY mode and a second BW based on receiving the first message. The data communication component 740 may be configured as or otherwise support a means for communicating data with the second wireless device using the second PHY mode and the second BW.

In some examples, the message component 730 may be configured as or otherwise support a means for transmitting a second message to the second wireless device, in which the second message indicates whether the first wireless device is capable of communicating using the first PHY mode and the first BW.

In some examples, to support selecting the second PHY mode and the second BW, the mode and BW selection component 735 may be configured as or otherwise support a means for determining that the first wireless device and the second wireless device are capable of communicating using the first PHY mode and the first BW based on receiving the first message, in which the second message indicates that the first wireless device is capable of communicating using the first PHY mode and the first BW. In some examples, to support selecting the second PHY mode and the second BW, the mode and BW selection component 735 may be configured as or otherwise support a means for selecting the first PHY mode and the first BW based on the determining, in which communicating data with the second wireless device includes communicating data with the second wireless device using the first PHY mode and the first BW.

In some examples, to support selecting the second PHY mode and the second BW, the mode and BW selection component 735 may be configured as or otherwise support a means for determining that the first wireless device is not capable of communicating using the first PHY mode and the first BW and that the second wireless device is capable of communicating using the first PHY mode and the first BW based on receiving the first message, in which the second message indicates that the first wireless device is not capable of communicating using the first PHY mode and the first BW. In some examples, to support selecting the second PHY mode and the second BW, the mode and BW selection component 735 may be configured as or otherwise support a means for selecting a third PHY mode and a third BW based on the determining, in which communicating data with the second wireless device includes communicating data with the second wireless device using the first PHY mode and the first BW.

In some examples, to support selecting the third PHY mode, the mode and BW selection component 735 may be configured as or otherwise support a means for determining a common PHY mode supported by the first wireless device and the second wireless device. In some examples, to support selecting the third PHY mode, the mode and BW selection component 735 may be configured as or otherwise support a means for selecting the common PHY mode based on determining the common PHY mode.

In some examples, to support selecting the third BW, the mode and BW selection component 735 may be configured as or otherwise support a means for determining a highest common BW supported by the first wireless device and the second wireless device. In some examples, to support selecting the third BW, the mode and BW selection component 735 may be configured as or otherwise support a means for selecting the highest common BW.

In some examples, the first PHY mode having the first latency below the first threshold includes an EHT PHY mode.

In some examples, to support receiving the first message, the message component 730 may be configured as or otherwise support a means for receiving an SDF including a MAC header, in which the MAC header includes an information element indicating a capability of communicating using the first PHY mode and the first BW.

In some examples, the information element includes a set of multiple bits. In some examples, a bit of the set of multiple bits corresponds to the first PHY mode. In some examples, a bit of the set of multiple bits corresponds to the first BW.

In some examples, to support establishing the wireless communication link with the second wireless device, the communication link establishment component 725 may be configured as or otherwise support a means for establishing a cluster including the first wireless device and the second wireless device.

In some examples, to support communicating data with the second wireless device using the second PHY mode and the second BW, the data path establishment component 745 may be configured as or otherwise support a means for establishing an NDP between the first wireless device and the second wireless device based on selecting the second PHY mode and the second BW. In some examples, to support communicating data with the second wireless device using the second PHY mode and the second BW, the data communication component 740 may be configured as or otherwise support a means for communicating data with the second wireless device over the NDP.

In some examples, the first message indicates a maximum supported BW for the second wireless device.

In some examples, the first BW is a BW of 240 Megahertz or 320 Megahertz.

Figure 8:
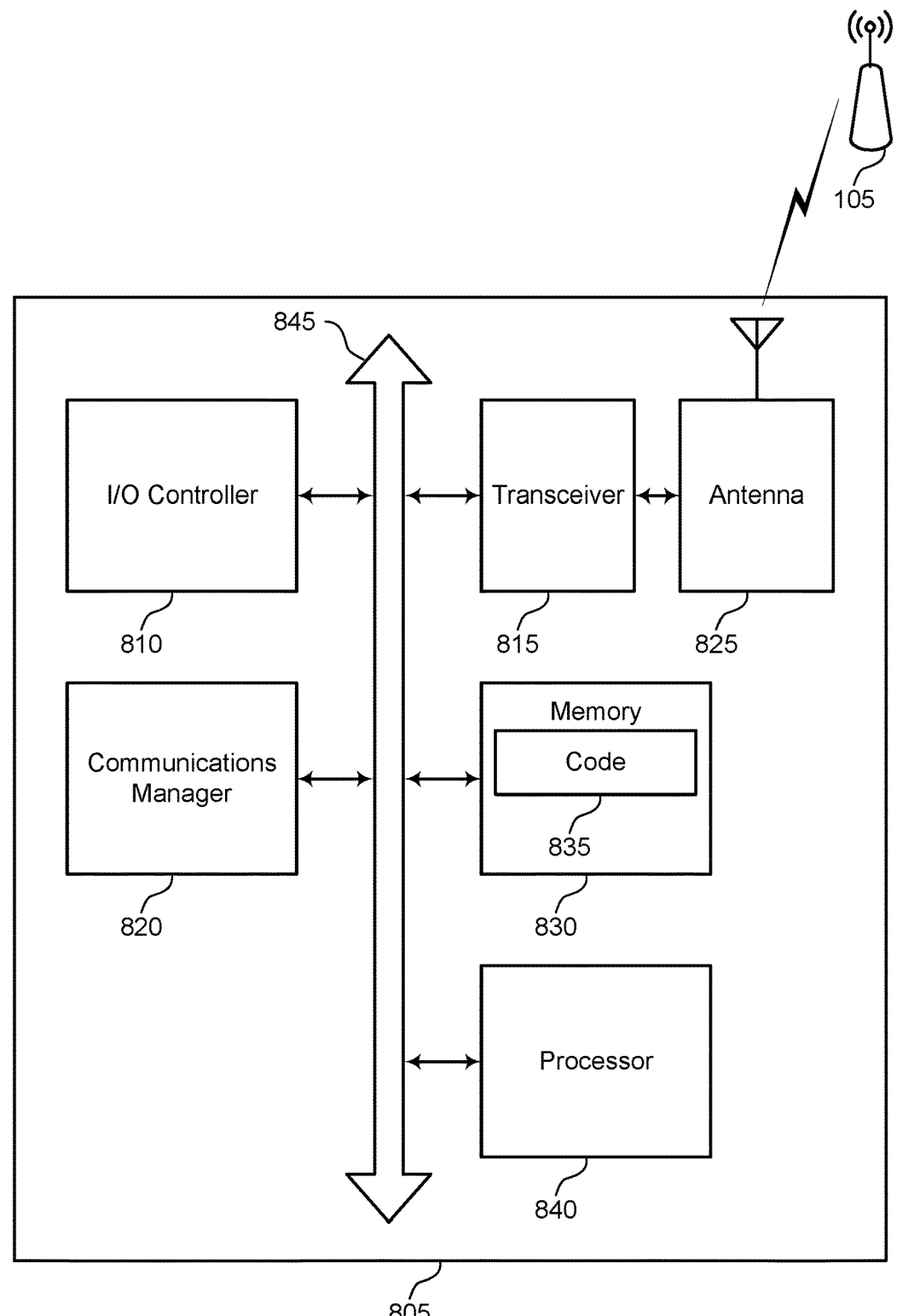
FIG. 8 shows a diagram of a system including a device that supports EHT and high frequency BW support indication in accordance with one or more aspects of the present disclosure.

FIG. 8 shows a diagram of a system including a device 805 that supports EHT and high frequency BW support indication in accordance with one or more aspects of the present disclosure. The device 805 may be an example of or include the components of a device 505, a device 605, or an STA as described herein. The device 805 may include components for bi-directional voice and data communications including components for transmitting and receiving communications, such as a communications manager 820, an I/O controller 810, a transceiver 815, an antenna 825, a memory 830, code 835, and a processor 840. These components may be in electronic communication or otherwise coupled (for example, operatively, communicatively, functionally, electronically, electrically) via one or more buses (for example, a bus 845).

The I/O controller 810 may manage input and output signals for the device 805. The I/O controller 810 may also manage peripherals not integrated into the device 805. In some examples, the I/O controller 810 may represent a physical connection or port to an external peripheral. In some examples, the I/O controller 810 may utilize an operating system such as iOS®, ANDROID®, MS-DOS®, MS-WINDOWS®, OS/2®, UNIX®, LINUX®, or another known operating system. In some other cases, the I/O controller 810 may represent or interact with a modem, a keyboard, a mouse, a touchscreen, or a similar device. In some examples, the I/O controller 810 may be implemented as part of a processor, such as the processor 840. In some examples, a user may interact with the device 805 via the I/O controller 810 or via hardware components controlled by the I/O controller 810.

In some examples, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets and provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. In some examples, the memory 830 may contain, among other things, a BIOS which may control basic hardware or software operation such as the interaction with peripheral components or devices.

The processor 840 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 840 may be configured to operate a memory array using a memory controller. In some other cases, a memory controller may be integrated into the processor 840. The processor 840 may be configured to execute computer-readable instructions stored in a memory (for example, the memory 830) to cause the device 805 to perform various functions (for example, functions or tasks supporting EHT and high frequency BW support indication). For example, the device 805 or a component of the device 805 may include a processor 840 and memory 830 coupled with or to the processor 840, the processor 840 and memory 830 configured to perform various functions described herein.

The communications manager 820 may support wireless communication at a first wireless device in accordance with examples as disclosed herein. For example, the communications manager 820 may be configured as or otherwise support a means for establishing a wireless communication link with a second wireless device. The communications manager 820 may be configured as or otherwise support a means for receiving, from the second wireless device, a first message based on establishing the wireless communication link, the first message indicating that the second wireless device is capable of communicating using a first PHY mode having a first latency below a first threshold and a first BW associated with a throughput having a second latency below a second threshold. The communications manager 820 may be configured as or otherwise support a means for selecting a second PHY mode and a second BW based on receiving the first message. The communications manager 820 may be configured as or otherwise support a means for communicating data with the second wireless device using the second PHY mode and the second BW.

By including or configuring the communications manager 820 in accordance with examples as described herein, the device 805 may support techniques for exchanging rich-data between multiple peers based on higher throughput using EHT PHY mode and high frequency BWs, which may result in reduced latency, in turn increasing power saving and battery life at wireless device, as well as improving user experience. Using EHT PHY mode and high frequency BWs based on indications may also result in improved reliability in communications.

FIG. 9 shows a flowchart illustrating a method 900 that supports EHT and high frequency BW support indication in accordance with one or more aspects of the present disclosure. The operations of the method 900 may be implemented by an STA or its components as described herein. For example, the operations of the method 900 may be performed by an STA as described with reference to FIGS. 1-8. In some examples, an STA may execute a set of instructions to control the functional elements of the STA to perform the described functions. Additionally, or alternatively, the STA 65 may perform aspects of the described functions using special-purpose hardware.

At 905, the method may include establishing a wireless communication link with a second wireless device. The operations of 905 may be performed in accordance with examples as disclosed herein. In some examples, aspects of the operations of 905 may be performed by a communication link establishment component 725 as described with reference to FIG. 7.

At 910, the method may include receiving, from the second wireless device, a first message based on establishing the wireless communication link, the first message indicating that the second wireless device is capable of communicating using a first PHY layer mode having a first latency below a first threshold and a first BW associated with a throughput having a second latency below a second threshold. The operations of 910 may be performed in accordance with examples as disclosed herein. In some examples, aspects of the operations of 910 may be performed by a message component 730 as described with reference to FIG. 7.

At 915, the method may include selecting a second PHY mode and a second BW based on receiving the first message. The operations of 915 may be performed in accordance with examples as disclosed herein. In some examples, aspects of the operations of 915 may be performed by a mode and BW selection component 735 as described with reference to FIG. 7.

At 920, the method may include communicating data with the second wireless device using the second PHY mode and the second BW. The operations of 920 may be performed in accordance with examples as disclosed herein. In some examples, aspects of the operations of 920 may be performed by a data communication component 740 as described with reference to FIG. 7.

FIG. 10 shows a flowchart illustrating a method 1000 that supports EHT and high frequency BW support indication in accordance with one or more aspects of the present disclosure. The operations of the method 1000 may be implemented by an STA or its components as described herein. For example, the operations of the method 1000 may be performed by an STA as described with reference to FIGS. 1-8. In some examples, an STA may execute a set of instructions to control the functional elements of the STA to perform the described functions. Additionally, or alternatively, the STA may perform aspects of the described functions using special-purpose hardware.

At 1005, the method may include establishing a wireless communication link with a second wireless device. The operations of 1005 may be performed in accordance with examples as disclosed herein. In some examples, aspects of the operations of 1005 may be performed by a communication link establishment component 725 as described with reference to FIG. 7.

At 1010, the method may include receiving, from the second wireless device, a first message based on establishing the wireless communication link, the first message indicating that the second wireless device is capable of communicating using a first PHY mode having a first latency below a first threshold and a first BW associated with a throughput having a second latency below a second threshold. The operations of 1010 may be performed in accordance with examples as disclosed herein. In some examples, aspects of the operations of 1010 may be performed by a message component 730 as described with reference to FIG. 7.

At 1015, the method may include transmitting a second message to the second wireless device, in which the second message indicates whether the first wireless device is capable of communicating using the first PHY mode and the first BW. The operations of 1015 may be performed in accordance with examples as disclosed herein. In some examples, aspects of the operations of 1015 may be performed by a message component 730 as described with reference to FIG. 7.

At 1020, the method may include selecting a second PHY mode and a second BW based on receiving the first message. The operations of 1020 may be performed in accordance with examples as disclosed herein. In some examples, aspects of the operations of 1020 may be performed by a mode and BW selection component 735 as described with reference to FIG. 7.

At 1025, the method may include communicating data with the second wireless device using the second PHY mode and the second BW. The operations of 1025 may be performed in accordance with examples as disclosed herein. In some examples, aspects of the operations of 1025 may be performed by a data communication component 740 as described with reference to FIG. 7.

FIG. 11 shows a flowchart illustrating a method 1100 that supports EHT and high frequency BW support indication in accordance with one or more aspects of the present disclosure. The operations of the method 1100 may be implemented by an STA or its components as described herein. For example, the operations of the method 1100 may be performed by an STA as described with reference to FIGS. 1-8. In some examples, an STA may execute a set of instructions to control the functional elements of the STA to perform the described functions. Additionally, or alternatively, the STA may perform aspects of the described functions using special-purpose hardware.

At 1105, the method may include establishing a wireless communication link with a second wireless device. The operations of 1105 may be performed in accordance with examples as disclosed herein. In some examples, aspects of the operations of 1105 may be performed by a communication link establishment component 725 as described with reference to FIG. 7.

At 1110, the method may include receiving, from the second wireless device, a first message based on establishing the wireless communication link, the first message indicating that the second wireless device is capable of communicating using a first PHY mode having a first latency below a first threshold and a first BW associated with a throughput having a second latency below a second threshold. The operations of 1110 may be performed in accordance with examples as disclosed herein. In some examples, aspects of the operations of 1110 may be performed by a message component 730 as described with reference to FIG. 7.

At 1115, the method may include transmitting a second message to the second wireless device, in which the second message indicates whether the first wireless device is capable of communicating using the first PHY mode and the first BW associated with a throughput having a second latency below a second threshold. The operations of 1115 may be performed in accordance with examples as disclosed herein. In some examples, aspects of the operations of 1120 may be performed by a message component 730 as described with reference to FIG. 7.

At 1120, the method may include determining that the first wireless device and the second wireless device are capable of communicating using the first PHY mode and the first BW based on receiving the first message, in which the second message indicates that the first wireless device is capable of communicating using the first PHY mode and the first BW. The operations of 1120 may be performed in accordance with examples as disclosed herein. In some examples, aspects of the operations of 1115 may be performed by a mode and BW selection component 735 as described with reference to FIG. 7.

At 1125, the method may include selecting the first PHY mode and the first BW based on the determining. The operations of 1125 may be performed in accordance with examples as disclosed herein. In some examples, aspects of the operations of 1125 may be performed by a mode and BW selection component 735 as described with reference to FIG. 7.

At 1130, the method may include communicating data with the second wireless device using the first PHY mode and the first BW. The operations of 1130 may be performed in accordance with examples as disclosed herein. In some examples, aspects of the operations of 1135 may be performed by a data communication component 740 as described with reference to FIG. 7.

FIG. 12 shows a flowchart illustrating a method 1200 that supports EHT and high frequency BW support indication in accordance with one or more aspects of the present disclosure. The operations of the method 1200 may be implemented by an STA or its components as described herein. For example, the operations of the method 1200 may be performed by an STA as described with reference to FIGS. 1-8. In some examples, an STA may execute a set of instructions to control the functional elements of the STA to perform the described functions. Additionally, or alternatively, the STA may perform aspects of the described functions using special-purpose hardware.

At 1205, the method may include establishing a wireless communication link with a second wireless device. The operations of 1205 may be performed in accordance with examples as disclosed herein. In some examples, aspects of the operations of 1205 may be performed by a communication link establishment component 725 as described with reference to FIG. 7.

At 1210, the method may include receiving, from the second wireless device, a first message based on establishing the wireless communication link, the first message indicating that the second wireless device is capable of communicating using a first PHY mode having a first latency below a first threshold and a first BW associated with a throughput having a second latency below a second threshold. The operations of 1210 may be performed in accordance with examples as disclosed herein. In some examples, aspects of the operations of 1210 may be performed by a message component 730 as described with reference to FIG. 7.

At 1215, the method may include transmitting a second message to the second wireless device, in which the second message indicates whether the first wireless device is capable of communicating using the first PHY mode and the first BW. The operations of 1215 may be performed in accordance with examples as disclosed herein. In some examples, aspects of the operations of 1220 may be performed by a message component 730 as described with reference to FIG. 7.

At 1220, the method may include determining that the first wireless device is not capable of communicating using the first PHY mode and the first BW and that the second wireless device is capable of communicating using the first PHY mode and the first BW based on receiving the first message, in which the second message indicates that the first wireless device is not capable of communicating using the first PHY mode and the first BW. The operations of 1220 may be performed in accordance with examples as disclosed herein. In some examples, aspects of the operations of 1215 may be performed by a mode and BW selection component 735 as described with reference to FIG. 7.

At 1225, the method may include selecting a third PHY mode and a third BW based on the determining. The operations of 1225 may be performed in accordance with examples as disclosed herein. In some examples, aspects of the operations of 1225 may be performed by a mode and BW selection component 735 as described with reference to FIG. 7.

At 1230, the method may include communicating data with the second wireless device using the third PHY mode and the third BW. The operations of 1230 may be performed in accordance with examples as disclosed herein. In some examples, aspects of the operations of 1235 may be performed by a data communication component 740 as described with reference to FIG. 7.

It should be noted that the methods described herein describe possible implementations, and that the operations and the steps may be rearranged or otherwise modified and that other implementations are possible. Furthermore, aspects from two or more of the methods may be combined.

The following provides an overview of aspects of the present disclosure:

Aspect 1: A method for wireless communication at a first wireless device, including: establishing a wireless communication link with a second wireless device; receiving, from the second wireless device, a first message based on establishing the wireless communication link, the first message indicating that the second wireless device is capable of communicating using a first PHY mode having a first latency below a first threshold and a first BW associated with a throughput having a second latency below a second threshold; selecting a second PHY mode and a second BW based on receiving the first message; and communicating data with the second wireless device using the second PHY mode and the second BW.

Aspect 2: The method of aspect 1, further including: transmitting a second message to the second wireless device, in which the second message indicates whether the first wireless device is capable of communicating using the first PHY mode and the first BW.

Aspect 3: The method of aspect 2, in which selecting the second PHY mode and the second BW includes: determining that the first wireless device and the second wireless device are capable of communicating using the first PHY mode and the first BW based on receiving the first message, in which the second message indicates that the first wireless device is capable of communicating using the first PHY mode and the first BW; and selecting the first PHY mode and the first BW based on the determining, in which communicating data with the second wireless device includes communicating data with the second wireless device using the first PHY mode and the first BW.

Aspect 4: The method of any of aspects 2 through 3, in which selecting the second PHY mode and the second BW includes: determining that the first wireless device is not capable of communicating using the first PHY mode and the first BW and that the second wireless device is capable of communicating using the first PHY mode and the first BW based on receiving the first message, in which the second message indicates that the first wireless device is not capable of communicating using the first PHY mode and the first BW; and selecting a third PHY mode and a third BW based on the determining, in which communicating data with the second wireless device includes communicating data with the second wireless device using the third PHY mode and the third BW.

Aspect 5: The method of aspect 4, in which selecting the third PHY mode includes: determining a common PHY mode supported by the first wireless device and the second wireless device; and selecting the common PHY mode based on determining the common PHY mode.

Aspect 6: The method of any of aspects 4 through 5, in which selecting the third BW includes: determining a highest common BW supported by the first wireless device and the second wireless device; and selecting the highest common BW.

Aspect 7: The method of any of aspects 1 through 6, in which the first PHY mode having the first latency below the first threshold includes an EHT PHY mode.

Aspect 8: The method of any of aspects 1 through 7, in which receiving the first message includes: receiving an SDF including a MAC header, in which the MAC header includes an information element indicating a capability of communicating using the first PHY mode and the first BW.

Aspect 9: The method of aspect 8, in which the information element includes multiple bits, and a bit of the multiple bits corresponds to the first PHY mode and a bit of the multiple bits corresponds to the first BW.

Aspect 10: The method of any of aspects 1 through 9, in which establishing the wireless communication link with the second wireless device includes: establishing a cluster including the first wireless device and the second wireless device.

Aspect 11: The method of any of aspects 1 through 10, in which communicating data with the second wireless device using the second PHY mode and the second BW includes: establishing an NDP between the first wireless device and the second wireless device based on selecting the second PHY mode and the second BW; and communicating data with the second wireless device over the NDP.

Aspect 12: The method of any of aspects 1 through 11, in which the first message indicates a maximum supported BW for the second wireless device.

Aspect 13: The method of any of aspects 1 through 12, in which the first BW is a BW of 240 Megahertz or 320 Megahertz.

Aspect 14: An apparatus for wireless communication at a first wireless device, including a processor; memory coupled with the processor; and instructions stored in the memory and executable by the processor to cause the apparatus to perform a method of any of aspects 1 through 13.

Aspect 15: An apparatus for wireless communication at a first wireless device, including a means for performing a method of any of aspects 1 through 13.

Aspect 16: A non-transitory computer-readable medium storing code for wireless communication at a first wireless device, the code including instructions executable by a processor to perform a method of any of aspects 1 through 13.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, WLAN 100 and 200 of FIGS. 1 and 2—may include one or more carriers, in which each carrier may be a signal made up of multiple sub-carriers (for example, waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc, in which disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first wireless device, comprising:

establishing a wireless communication link with a second wireless device, wherein establishing the wireless communication link with the second wireless device comprises establishing a cluster including the first wireless device and the second wireless device for neighbor awareness networking;

receiving, from the second wireless device, a first message based at least in part on establishing the wireless communication link, wherein the first message is a service discovery frame comprising a media access control header, and wherein the media access control header comprises an information element comprising:

a first set of bits indicating that the second wireless device is capable of communicating using a first physical layer mode having a first latency below a first threshold, and a second set of bits indicating a first bandwidth associated with a throughput having a second latency below a second threshold, the second set of bits comprising at least a first bit that indicates whether the second wireless device supports a 320 Megahertz bandwidth;

selecting a second physical layer mode supported at the second wireless device in accordance with the first physical layer mode and a second bandwidth supported at the second wireless device in accordance with the first bandwidth based at least in part on receiving the first message; and communicating data with the second wireless device using the second physical layer mode and the second bandwidth, wherein communicating the data with the second wireless device using the second physical layer mode and the second bandwidth comprises:

establishing a neighbor awareness networking data path between the first wireless device and the second wireless device based at least in part on selecting the second physical layer mode and the second bandwidth; and communicating the data with the second wireless device over the neighbor awareness networking data path.

2. The method of claim 1, further comprising transmitting a second message to the second wireless device, wherein the second message indicates whether the first wireless device is capable of communicating using the first physical layer mode and the first bandwidth.

3. The method of claim 2, wherein selecting the second physical layer mode and the second bandwidth comprises:

determining that the first wireless device and the second wireless device are capable of communicating using the first physical layer mode and the first bandwidth based at least in part on receiving the first message, wherein the second message indicates that the first wireless device is capable of communicating using the first physical layer mode and the first bandwidth; and selecting the first physical layer mode and the first bandwidth based at least in part on the determining, wherein communicating the data with the second wireless device comprises communicating the data with the second wireless device using the first physical layer mode and the first bandwidth.

4. The method of claim 2, wherein selecting the second physical layer mode and the second bandwidth comprises:

determining that the first wireless device is not capable of communicating using the first physical layer mode and the first bandwidth and that the second wireless device is capable of communicating using the first physical layer mode and the first bandwidth based at least in part on receiving the first message, wherein the second message indicates that the first wireless device is not capable of communicating using the first physical layer mode and the first bandwidth; and selecting a third physical layer mode and a third bandwidth based at least in part on the determining, wherein communicating the data with the second wireless device comprises communicating the data with the second wireless device using the third physical layer mode and the third bandwidth.

5. The method of claim 4, wherein selecting the third physical layer mode comprises:

determining a common physical layer mode supported by the first wireless device and the second wireless device; and selecting the common physical layer mode based at least in part on determining the common physical layer mode.

6. The method of claim 4, wherein selecting the third bandwidth comprises:

determining a highest common bandwidth supported by the first wireless device and the second wireless device; and selecting the highest common bandwidth.

7. The method of claim 1, wherein the first physical layer mode having the first latency below the first threshold comprises an extremely high throughput physical layer mode.

8. The method of claim 1, wherein the information element indicates a capability of communicating using the first physical layer mode and the first bandwidth.

9. The method of claim 8, wherein the second set of bits further comprises a second bit that indicates whether the second wireless device supports a 240 Megahertz bandwidth.

10. The method of claim 1, wherein the first message indicates a maximum supported bandwidth for the second wireless device.

11. The method of claim 1, wherein the first bandwidth is a 240 Megahertz bandwidth or the 320 Megahertz bandwidth.

12. A first wireless device, comprising:

at least one processor; and at least one memory coupled with the at least one processor and storing instructions executable by the at least one processor to cause the first wireless device to:

establish a wireless communication link with a second wireless device, wherein, to establish the wireless communication link with the second wireless device, the instructions are executable by the at least one processor to cause the first wireless device to establish a cluster including the first wireless device and the second wireless device for neighbor awareness networking;

receive, from the second wireless device, a first message based at least in part on establishing the wireless communication link, wherein the first message is a service discovery frame comprising a media access control header, and wherein the media access control header comprises an information element comprising:

a first set of bits indicating that the second wireless device is capable of communicating using a first physical layer mode having a first latency below a first threshold, and a second set of bits indicating a first bandwidth associated with a throughput having a second latency below a second threshold, the second set of bits comprising at least a first bit that indicates whether the second wireless device supports a 320 Megahertz bandwidth;

select a second physical layer mode supported at the second wireless device in accordance with the first physical layer mode and a second bandwidth supported at the second wireless device in accordance with the first bandwidth based at least in part on receiving the first message; and communicate data with the second wireless device using the second physical layer mode and the second bandwidth, wherein, to communicate the data with the second wireless device using the second physical layer mode and the second bandwidth, the instructions are executable by the at least one processor to cause the first wireless device to:

establish a neighbor awareness networking data path between the first wireless device and the second wireless device based at least in part on selecting the second physical layer mode and the second bandwidth; and communicate the data with the second wireless device over the neighbor awareness networking data path.

13. The first wireless device of claim 12, wherein the instructions are further executable by the at least one processor to cause the first wireless device to transmit a second message to the second wireless device, wherein the second message indicates whether the first wireless device is capable of communicating using the first physical layer mode and the first bandwidth.

14. The first wireless device of claim 13, wherein the instructions to select the second physical layer mode and the second bandwidth are executable by the at least one processor to cause the first wireless device to:

determine that the first wireless device and the second wireless device are capable of communicating using the first physical layer mode and the first bandwidth based at least in part on receiving the first message, wherein the second message indicates that the first wireless device is capable of communicating using the first physical layer mode and the first bandwidth; and select the first physical layer mode and the first bandwidth based at least in part on the determining, wherein communicating the data with the second wireless device comprises communicating the data with the second wireless device using the first physical layer mode and the first bandwidth.

15. The first wireless device of claim 13, wherein the instructions to select the second physical layer mode and the second bandwidth are executable by the at least one processor to cause the first wireless device to:

determine that the first wireless device is not capable of communicating using the first physical layer mode and the first bandwidth and that the second wireless device is capable of communicating using the first physical layer mode and the first bandwidth based at least in part on receiving the first message, wherein the second message indicates that the first wireless device is not capable of communicating using the first physical layer mode and the first bandwidth; and select a third physical layer mode and a third bandwidth based at least in part on the determining, wherein communicating the data with the second wireless device comprises communicating the data with the second wireless device using the third physical layer mode and the third bandwidth.

16. The first wireless device of claim 15, wherein the instructions to select the third physical layer mode are executable by the at least one processor to cause the first wireless device to:

determine a common physical layer mode supported by the first wireless device and the second wireless device; and select the common physical layer mode based at least in part on determining the common physical layer mode.

17. The first wireless device of claim 15, wherein the instructions to select the third bandwidth are executable by the at least one processor to cause the first wireless device to:

determine a highest common bandwidth supported by the first wireless device and the second wireless device; and select the highest common bandwidth.

18. The first wireless device of claim 12, wherein the first physical layer mode having the first latency below the first threshold comprises an extremely high throughput physical layer mode.

19. The first wireless device of claim 12, wherein the information element indicates a capability of communicating using the first physical layer mode and the first bandwidth.

20. The first wireless device of claim 12, wherein the first message indicates a maximum supported bandwidth for the second wireless device.

21. The first wireless device of claim 12, wherein the first bandwidth is a 240 Megahertz bandwidth or the 320 Megahertz bandwidth.

22. An apparatus for wireless communication at a first wireless device, comprising:

means for establishing a wireless communication link with a second wireless device, wherein the means for establishing the wireless communication link with the second wireless device comprise means for establishing a cluster including the first wireless device and the second wireless device for neighbor awareness networking;

means for receiving, from the second wireless device, a first message based at least in part on establishing the wireless communication link, wherein the first message is a service discovery frame comprising a media access control header, and wherein the media access control header comprises an information element comprising:

a first set of bits indicating that the second wireless device is capable of communicating using a first physical layer mode having a first latency below a first threshold, and a second set of bits indicating a first bandwidth associated with a throughput having a second latency below a second threshold, the second set of bits comprising at least a first bit that indicates whether the second wireless device supports a 320 Megahertz bandwidth;

means for selecting a second physical layer mode supported at the second wireless device in accordance with the first physical layer mode and a second bandwidth supported at the second wireless device in accordance with the first bandwidth based at least in part on receiving the first message; and means for communicating data with the second wireless device using the second physical layer mode and the second bandwidth, wherein the means for communicating the data with the second wireless device using the second physical layer mode and the second bandwidth comprise:

means for establishing a neighbor awareness networking data path between the first wireless device and the second wireless device based at least in part on selecting the second physical layer mode and the second bandwidth; and means for communicating the data with the second wireless device over the neighbor awareness networking data path.

23. The apparatus of claim 22, wherein the apparatus further comprises means for transmitting a second message to the second wireless device, wherein the second message indicates whether the first wireless device is capable of communicating using the first physical layer mode and the first bandwidth.

24. The apparatus of claim 23, wherein the means for selecting the second physical layer mode and the second bandwidth comprise:

means for determining that the first wireless device and the second wireless device are capable of communicating using the first physical layer mode and the first bandwidth based at least in part on receiving the first message, wherein the second message indicates that the first wireless device is capable of communicating using the first physical layer mode and the first bandwidth; and means for selecting the first physical layer mode and the first bandwidth based at least in part on the determining, wherein communicating the data with the second wireless device comprises communicating the data with the second wireless device using the first physical layer mode and the first bandwidth.

25. The apparatus of claim 23, wherein the means for selecting the second physical layer mode and the second bandwidth comprise:

means for determining that the first wireless device is not capable of communicating using the first physical layer mode and the first bandwidth and that the second wireless device is capable of communicating using the first physical layer mode and the first bandwidth based at least in part on receiving the first message, wherein the second message indicates that the first wireless device is not capable of communicating using the first physical layer mode and the first bandwidth; and means for selecting a third physical layer mode and a third bandwidth based at least in part on the determining, wherein communicating the data with the second wireless device comprises communicating the data with the second wireless device using the third physical layer mode and the third bandwidth.

26. The apparatus of claim 22, wherein the first physical layer mode having the first latency below the first threshold comprises an extremely high throughput physical layer mode.

* * * * *